(12) United States Patent
Ishikura et al.

(10) Patent No.: US 10,452,213 B2
(45) Date of Patent: Oct. 22, 2019

(54) TOUCH PANEL AND OPERATION DETERMINING METHOD

(71) Applicant: Sharp Kabushiki Kaisha, Sakai, Osaka (JP)

(72) Inventors: Tomoya Ishikura, Sakai (JP); Hiroaki Hara, Sakai (JP)

(73) Assignee: SHARP KABUSHIKI KAISHA, Sakai (JP)

( * ) Notice: Subject to any disclaimer, the term of this patent is extended or adjusted under 35 U.S.C. 154(b) by 137 days.

(21) Appl. No.: 15/539,705

(22) PCT Filed: Oct. 6, 2015

(86) PCT No.: PCT/JP2015/078406
§ 371 (c)(1),
(2) Date: Jun. 26, 2017

(87) PCT Pub. No.: WO2016/111062
PCT Pub. Date: Jul. 14, 2016

(65) Prior Publication Data
US 2017/0371446 A1 Dec. 28, 2017

(30) Foreign Application Priority Data

Jan. 9, 2015 (JP) .................................. 2015-003550
Jun. 12, 2015 (JP) .................................. 2015-119595

(51) Int. Cl.
*G09G 5/00* (2006.01)
*G06F 3/044* (2006.01)
(Continued)

(52) U.S. Cl.
CPC ............ *G06F 3/044* (2013.01); *G06F 3/0416* (2013.01); *G06F 3/0482* (2013.01);
(Continued)

(58) Field of Classification Search
CPC ...... G06F 3/044; G06F 3/0416; G06F 3/0482; G06F 3/04845; G06F 3/04888; G06F 3/04883
(Continued)

(56) References Cited

U.S. PATENT DOCUMENTS

2008/0158145 A1   7/2008   Westerman
2008/0158185 A1*  7/2008   Westerman ........... G06F 3/0488
                                                    345/173
(Continued)

FOREIGN PATENT DOCUMENTS

JP   08-263212 A    10/1996
JP   2011-118919 A   6/2011
(Continued)

OTHER PUBLICATIONS

Official Communication issued in International Patent Application No. PCT/JP2015/078406, dated Dec. 15, 2015.

*Primary Examiner* — Jennifer T Nguyen
(74) *Attorney, Agent, or Firm* — Keating & Bennett, LLP

(57) ABSTRACT

The present invention is provided with: an input point detecting unit (31) which detects, as input points, detection points on which a touch operation is performed; and an erase-operation determining unit (32) which determines whether a user operation is an erase-operation for erasing an image displayed on a display screen according to the concentrated degree of the input points. Accordingly, an erase-operation can be easily performed.

16 Claims, 13 Drawing Sheets

(51) Int. Cl.
  *G06F 3/041* (2006.01)
  *G06F 3/0482* (2013.01)
  *G06F 3/0484* (2013.01)
  *G06F 3/0488* (2013.01)

(52) U.S. Cl.
  CPC ........ *G06F 3/0488* (2013.01); *G06F 3/04845* (2013.01); *G06F 3/04883* (2013.01)

(58) Field of Classification Search
  USPC .................................. 345/173, 178; 715/863
  See application file for complete search history.

(56) References Cited

U.S. PATENT DOCUMENTS

| | | | |
|---|---|---|---|
| 2012/0249432 A1* | 10/2012 | Ge | G06F 3/0488 345/173 |
| 2015/0193037 A1* | 7/2015 | Masaki | G06F 3/03545 345/173 |

FOREIGN PATENT DOCUMENTS

| | | | |
|---|---|---|---|
| JP | 2013-200835 A | 10/2013 | |
| JP | 2014-206933 A | 10/2014 | |

* cited by examiner (a)

| Time | P1 | | P2 | | P3 | | P4 | | P5 | | P6 | |
|---|---|---|---|---|---|---|---|---|---|---|---|---|
| t | x | y | x | y | x | y | x | y | x | y | x | y |
| 1 | 11.59 | 8.28 | 13.09 | 1.98 | 7.36 | 8.61 | 17.36 | 6.11 | 12.36 | 12.11 | 15.36 | 10.15 |
| 2 | 11.39 | 8.08 | 12.86 | 1.90 | 7.20 | 8.48 | 17.12 | 5.92 | 12.12 | 11.92 | 15.12 | 9.91 |
| 3 | 11.09 | 7.78 | 12.70 | 1.88 | 6.93 | 8.25 | 16.93 | 5.75 | 11.93 | 11.75 | 14.93 | 9.74 |
| 4 | 10.89 | 7.58 | 12.49 | 1.82 | 6.71 | 8.03 | 16.71 | 5.53 | 11.71 | 11.53 | 14.71 | 9.52 |
| 5 | 10.49 | 7.08 | 12.23 | 1.71 | 6.29 | 7.58 | 16.29 | 5.08 | 11.29 | 11.08 | 14.29 | 9.00 |
| 6 | 10.19 | 6.78 | 12.08 | 1.60 | 6.00 | 7.25 | 16.00 | 4.75 | 11.00 | 10.75 | 14.00 | 8.76 |
| 7 | 9.79 | 6.28 | 11.76 | 1.50 | 5.57 | 6.75 | 15.57 | 4.25 | 10.57 | 10.25 | 13.57 | 8.24 |
| 8 | 8.89 | 5.28 | 11.28 | 1.42 | 4.68 | 5.67 | 14.68 | 3.17 | 9.68 | 9.17 | 12.68 | 7.17 |
| 9 | 8.69 | 4.98 | 10.28 | 1.31 | 4.41 | 5.33 | 14.41 | 2.83 | 9.41 | 8.83 | 12.41 | 6.83 |
| 10 | 8.39 | 4.68 | 10.00 | 1.28 | 4.13 | 4.98 | 14.13 | 2.48 | 9.13 | 8.48 | 12.13 | 6.49 |

(b)

| t | P3-P1 | P1-P5 | P5-P2 | P2-P6 | P6-P4 | P5-P6 |
|---|---|---|---|---|---|---|
| 1 | 4.24 | 3.90 | 10.15 | 8.48 | 4.51 | 3.58 |
| 2 | 4.21 | 3.91 | 10.05 | 8.32 | 4.46 | 3.61 |
| 3 | 4.18 | 4.06 | 9.90 | 8.17 | 4.46 | 3.61 |
| 4 | 4.20 | 4.04 | 9.74 | 8.01 | 4.46 | 3.61 |
| 5 | 4.23 | 4.09 | 9.42 | 7.58 | 4.40 | 3.65 |
| 6 | 4.21 | 4.06 | 9.22 | 7.41 | 4.48 | 3.60 |
| 7 | 4.24 | 4.04 | 8.83 | 6.98 | 4.47 | 3.61 |
| 8 | 4.22 | 3.97 | 7.91 | 5.92 | 4.47 | 3.61 |
| 9 | 4.29 | 3.91 | 7.57 | 5.92 | 4.47 | 3.60 |
| 10 | 4.27 | 3.88 | 7.26 | 5.63 | 4.48 | 3.60 |
| max | 4.29 | 4.08 | 10.15 | 8.48 | 4.51 | 3.65 |
| min | 4.18 | 3.88 | 7.26 | 5.63 | 4.40 | 3.58 |
| Δmax | 0.11 | 0.20 | 2.89 | 2.85 | 0.11 | 0.07 |

(c)

(a)

| Time | P1 | | P3 | | P4 | | P5 | | P6 | |
|---|---|---|---|---|---|---|---|---|---|---|
| t | x | y | x | y | x | y | x | y | x | y |
| 1 | 11.59 | 8.28 | 7.36 | 8.61 | 17.36 | 6.11 | 12.36 | 12.11 | 15.36 | 10.15 |
| 2 | 11.39 | 8.08 | 6.86 | 8.48 | 17.12 | 5.92 | 12.12 | 11.92 | 15.12 | 9.91 |
| 3 | 11.09 | 7.78 | 6.06 | 8.25 | 16.93 | 5.75 | 11.93 | 11.75 | 14.93 | 9.74 |
| 4 | 10.89 | 7.58 | 5.06 | 8.03 | 16.71 | 5.53 | 11.71 | 11.53 | 14.71 | 9.52 |
| 5 | 10.49 | 7.08 | 4.26 | 7.58 | 16.29 | 5.08 | 11.29 | 11.08 | 14.29 | 9.00 |
| 6 | 10.19 | 6.78 | 3.46 | 7.25 | 16.00 | 4.75 | 11.00 | 10.75 | 14.00 | 8.76 |
| 7 | 9.79 | 6.28 | 2.66 | 6.75 | 15.57 | 4.25 | 10.57 | 10.25 | 13.57 | 8.24 |
| 8 | 8.89 | 5.28 | 1.86 | 5.67 | 14.68 | 3.17 | 9.68 | 9.17 | 12.68 | 7.17 |
| 9 | 8.69 | 4.98 | 1.06 | 5.33 | 14.41 | 2.83 | 9.41 | 8.83 | 12.41 | 6.83 |
| 10 | 8.39 | 4.68 | 0.26 | 4.98 | 14.13 | 2.48 | 9.13 | 8.48 | 12.13 | 6.49 |

(b)

| t | P1-P2 | P1-P4 | P4-P5 | P5-P3 |
|---|---|---|---|---|
| 1 | 4.24 | 3.90 | 3.58 | 4.51 |
| 2 | 4.55 | 3.91 | 3.61 | 4.46 |
| 3 | 5.05 | 4.06 | 3.61 | 4.46 |
| 4 | 5.85 | 4.04 | 3.61 | 4.46 |
| 5 | 6.25 | 4.08 | 3.65 | 4.40 |
| 6 | 6.75 | 4.06 | 3.60 | 4.48 |
| 7 | 7.15 | 4.04 | 3.61 | 4.47 |
| 8 | 7.04 | 3.97 | 3.61 | 4.47 |
| 9 | 7.64 | 3.91 | 3.60 | 4.47 |
| 10 | 8.14 | 3.88 | 3.60 | 4.48 |
| max | 8.14 | 4.08 | 3.65 | 4.51 |
| min | 4.24 | 3.88 | 3.58 | 4.40 |
| Δmax | 3.89 | 0.20 | 0.07 | 0.11 |

(c)

TOUCH PANEL AND OPERATION DETERMINING METHOD

BACKGROUND OF THE INVENTION

Field of the Invention

The present invention relates to a touch panel having an erase function for erasing a part of an image displayed on a display screen according to a touch operation of the user.

Description of the Related Art

Conventionally, as a method of erasing an image displayed on a display screen according to a user's touch operation, the method was known that the touch operation was next operated after any special operation was preliminarily operated indicating that a forthcoming touch operation was to erase the image, or any input instrument was operated which was peculiar to erasing the image.

For example, in Patent Document 1, there is disclosed a technique that two coordinate-indicating parts are provided on a rectangular eraser (input instrument special for erasing) for instructing to erase an image displayed on a display screen. While the eraser is contacted with the display screen and continuously moved on the screen, a rectangular region is defined by the two coordinate-indicating parts as having the both ends of the diagonal line, so that the image contained by an erase region corresponding to the travel tracks of the eraser is erased.

RELATED ART

Patent Document

Patent Document 1: Japanese Unexamined Patent Application Publication No. 2008-263212 (published on Oct. 11, 1996).

SUMMARY OF THE INVENTION

Problems That the Invention is to Solve

However, the technique disclosed in Patent Document 1 has the problem that the user needs to use the input instrument special for erasing to instruct to erase the image displayed on the display screen, so that it was inconvenient for the user.

Further, in the method that the touch operation is next operated after any special operation is preliminarily operated indicating that a forthcoming touch operation is to erase the image, two-step operation is needed which was troublesome.

To solve these problems, it is an object of the present invention to provide an improved touch panel for easily performing an erase-operation.

Means of Solving the Problems

According to a first aspect of the present invention, a touch panel is provided with a plurality of detection points arranged on a display screen to detect a user's touch operation onto the display screen by detecting that an object is contacted with or close to each detection point, the touch panel including an input point detecting unit for detecting, as input points, the detection points on which the user's touch operation is performed; and an erase-operation determining unit for determining whether or not a user's operation is an erase-operation for erasing an image displayed on a display screen according to the concentrated degree of the input points.

Effect of the Invention

According to the present invention, it is possible to vary the concentrated degree of the input points by changing an area of the user's touch operation on the display screen, so that it is automatically determined whether the user's touch operation is the erase-operation or any other operation. Therefore, it is needless that a touch operation is next operated after any special operation is preliminarily operated indicating that the forthcoming touch operation is to erase the image, or any input instrument is operated which is peculiar to erasing the image, as the conventional technique. Accordingly, an erase-operation can be easily performed.

BEST MODE FOR CARRYING OUT THE INVENTION

First Embodiment

A first embodiment of the present invention will be described below.

1-1, Overall Configuration of Touch Panel

Figure 1:
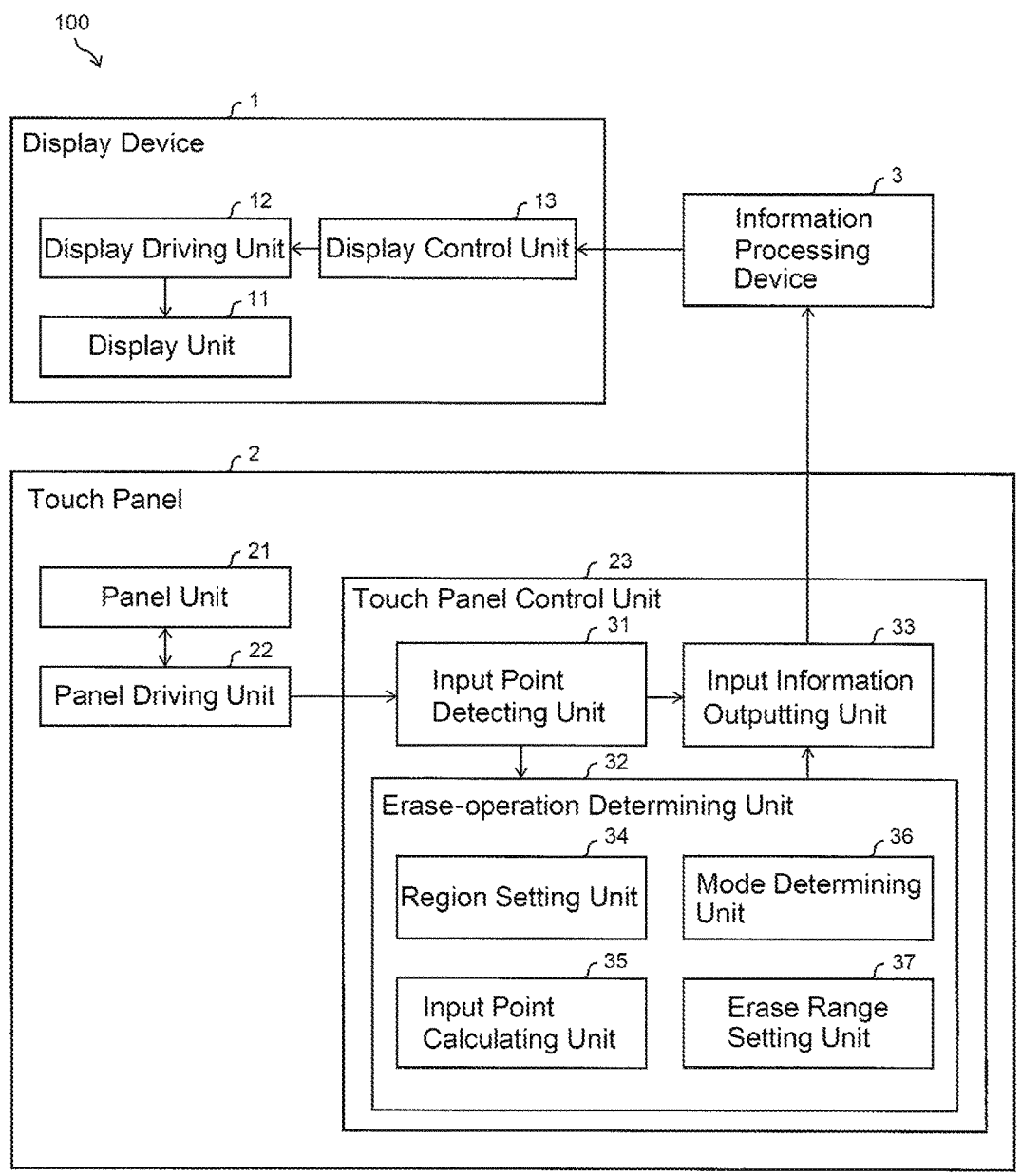
FIG. 1 is an overall configuration diagram showing a picture device including a touch panel according to a first embodiment of the present invention.

FIG. 1 is an overall configuration diagram showing a picture device including a touch panel according to a first embodiment of the present invention. As shown in FIG. 1, the picture device 100 includes a display device 1, a touch panel 2, and an information processing device 3.

The information processing device 3 outputs image data to be displayed to the display device 1, and acquires from the touch panel 2, information according to user's touch operation (operation input) to the display screen of the image data displayed. Further, the information processing device 3 renews the image data to be output to the display device 1 on the basis of the information corresponding to the user's touch operation derived from the touch panel 2, or performs any other operation according to the user's touch operation. Besides, the configuration of the information processing device 3 should not be limited thereto, and it may be a personal computer.

The display device 1 includes a display unit 11, a display driving unit 12 and a display control unit 13.

The display unit 11 is provided for displaying an image corresponding to the image data acquired from the information processing device 3 in the display screen. For example, it may be a liquid crystal display, an organic EL (electroluminescence) display, a plasma display, a projector, or the like. The resolution and the largeness of the display unit 11 should not be limitative, and, for example, it may be a full high definition television size of 1920 pixels×1080 pixels, or 4K size of 3840 pixels×2160 pixels.

The display driving unit 12 is responsive to the instructions from the display control unit 13 for driving the pixels of the display unit 11.

The display control unit 13 is responsive to the image data to be displayed for controlling the operation of the display driving unit 12, so that the display unit 11 displays an image corresponding to the image data to be displayed.

The touch panel 2 includes a panel unit 21, a panel driving unit 22 and a touch panel control unit 23.

Figure 2:
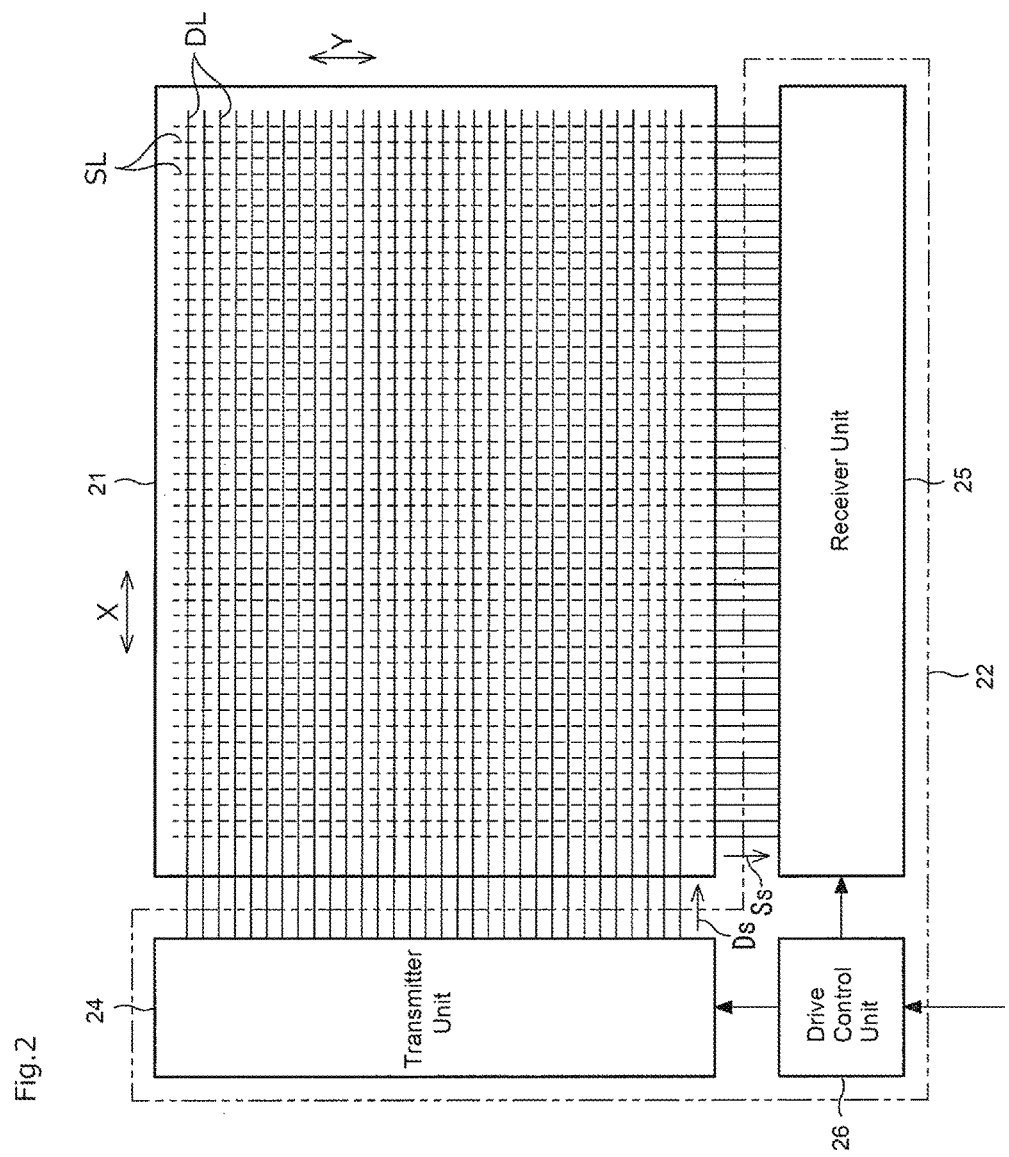
FIG. 2 is a diagram showing a configuration of a panel unit and a panel driving unit provided with the touch panel of FIG. 1.

FIG. 2 is a diagram showing a configuration of the panel unit 21 and the panel driving unit 22.

The panel unit 21 is overlaid on the display screen of the display device 1, so that signals corresponding to user's instruction inputs to the image displayed on the display unit 11 are output to the panel driving unit 22.

As shown in FIG. 2, the panel unit 21 has a plurality of drive lines DL arranged in parallel to each other, and a plurality of sense lines SL arranged in parallel to each other. The drive lines DL are extended in the x direction (the lateral direction of the paper face), and the sense lines SL are extended in the y direction (the longitudinal direction of the paper face) which is perpendicular to the x direction. The drive lines DL and the sense lines SL are arranged (in a matrix), so that both are crossed in a 3-dimensional form.

The number of each of the drive lines DL and the sense lines SL should not be limitative, and according to this embodiment of the present invention, the number of the drive lines DL is 4096 and the number of the sense lines SL is 2160, so that the variation of a capacitance is detected at each of the coordinate points of 4096×2160. The configuration of the panel unit 21 should not be limited to the above, and, it may be various type of panel units used in the touch panel of the capacitive type.

The panel driving unit 22 includes a transmitter unit 24, a receiver unit 25 and a drive control unit 26. The drive control unit 26 is provided for controlling operation timings of the transmitter unit 24 and the receiver unit 25. The transmitter unit 24 is provided for applying drive signals Ds at a timing corresponding to a predetermined frame rate to the drive lines DL at a timing instructed from the drive control unit 26, respectively. The receiver unit 25 is provided for acquiring sense signals Ss at a timing synchronized with the applied drive signals Ds on the drive lines DL. The sense signals Ss are response signals generated on the sense lines SL corresponding the applied drive signals Ds on the drive lines DL.

When a conductive object (e.g. a finger of the user or a pen peculiar to the touch panel) is close to the panel unit 21, the capacitance at the crossing points (detection points) of the drive lines DL and the sense lines SL is varied. The receiver unit 25 outputs to the touch panel control unit 23 (input point detecting unit 31), first signals corresponding to the capacitance at the crossing points of the drive lines DL and the sense lines SL, and second signals indicating the crossing points.

The touch panel control unit 23 includes the input point detecting unit 31, an erase-operation determining unit 32 and an input information outputting unit 33.

On the basis of the first signals corresponding to the capacitance at the crossing points of the drive lines DL and the sense lines SL, and the second signals indicating the crossing points, both acquired from the panel driving unit 22, the input point detecting unit 31 detects so that the crossing point, at which the capacitance is different by a predetermined value or more from the other crossing points, is detected as a touch operation point (input point), on which a touch operation to the panel unit 21 is performed by the user. Besides, in this embodiment of the present invention, the detection of the touch operations corresponding to one display screen is treated as one frame process, so that the process covering each frame is carried out at a predetermined cycle and the touch operation point is detected at each frame. Accordingly, the movement of the touch operation points across the continuous frames can be detected at each frame.

An erase-operation determining unit 32 includes a region setting unit 34, an input point calculating unit 35, a mode determining unit 36 and an erase range setting unit 37. The erase-operation determining unit determines whether or not the user's touch operation is an erase-operation (i.e. the operation for erasing the image displayed on the display unit 11 within a region according to the touch operations) on the basis of the input points detected by the input point detecting unit 31. If it is detected that the user's touch operation is the erase-operation, the erase-operation determining unit 32 sets an erase range according to the user's touch operations. The details of these processes in the erase-operation determining unit 32 will be described below.

The input information outputting unit 33 outputs the user's touch operation detected by the input point detecting unit 31, and the information determined by the erase-operation determining unit 32 to the information processing device 3.

More particularly, if the erase-operation determining unit 32 determines that it is the touch operation by the user, the information that it is the touch operation, and the information indicating the erase range are output to the information processing device 3. Further, if the erase-operation determining unit 32 determines that it is not the touch operation, the information that it is not the touch operation, and the information indicating the touch operation point by the user are output to the information processing device 3. Otherwise, if the erase-operation determining unit 32 determines that it is the touch operation by the user, the information (area information) indicating the erase range may be output. Further, if the erase-operation determining unit 32 determines that it is not the touch operation, position information (point information) of the input point corresponding to the touch operation may be output. In such a case, the information processing device 3 may determine whether or not it is the erase-operation depending on receiving the information (area information) indicating the erase range or the position information (point information) of the input point. The user's operations other than the erase-operation are picture instructions of inputting lines, points, characters, drawings or the like, or optional instructions of selecting a desired item from a menu displayed in the display unit 11.

Thereby, the information processing device 3 varies the image displayed on the display unit 11 according to the user's touch operation and performs various processes according to the user's touch operation.

If it is detected that the user's touch operation is the erase-operation, for example, the information processing device 3 erases the image included within the erase range. Besides, if it is detected that the user's touch operation is the erase-operation, the information processing device 3 may display an image indicating the shape of the erase range (such as a frame image) at a position corresponding to the user's touch operation.

If it is detected that the user's touch operation is not the erase-operation, and the point of the user's touch operation is a position corresponding to the menu selection image display, the information processing device 3 performs the menu selection process corresponding to the touch operation. If it is detected that the user's touch operation is not the erase-operation, and the point of the touch operation is a picture region, the information processing device 3 performs the picture process. For example, in the picture process, a picture is drawn by connecting coordinates of the touch operations detected at each frame with lines or curves.

The information processing device 3 may be stored in a storage (not shown) within the display device 1, such that picture information of handwritten information or graph information, and menu information tentatively overlapped with and displayed on the picture information are stored in a different layer. Then, the stored information in the storage may be renewed according to the user's touch operation.

1-2, Detection Process of Instruction Input by Touch Operation

Figure 3:
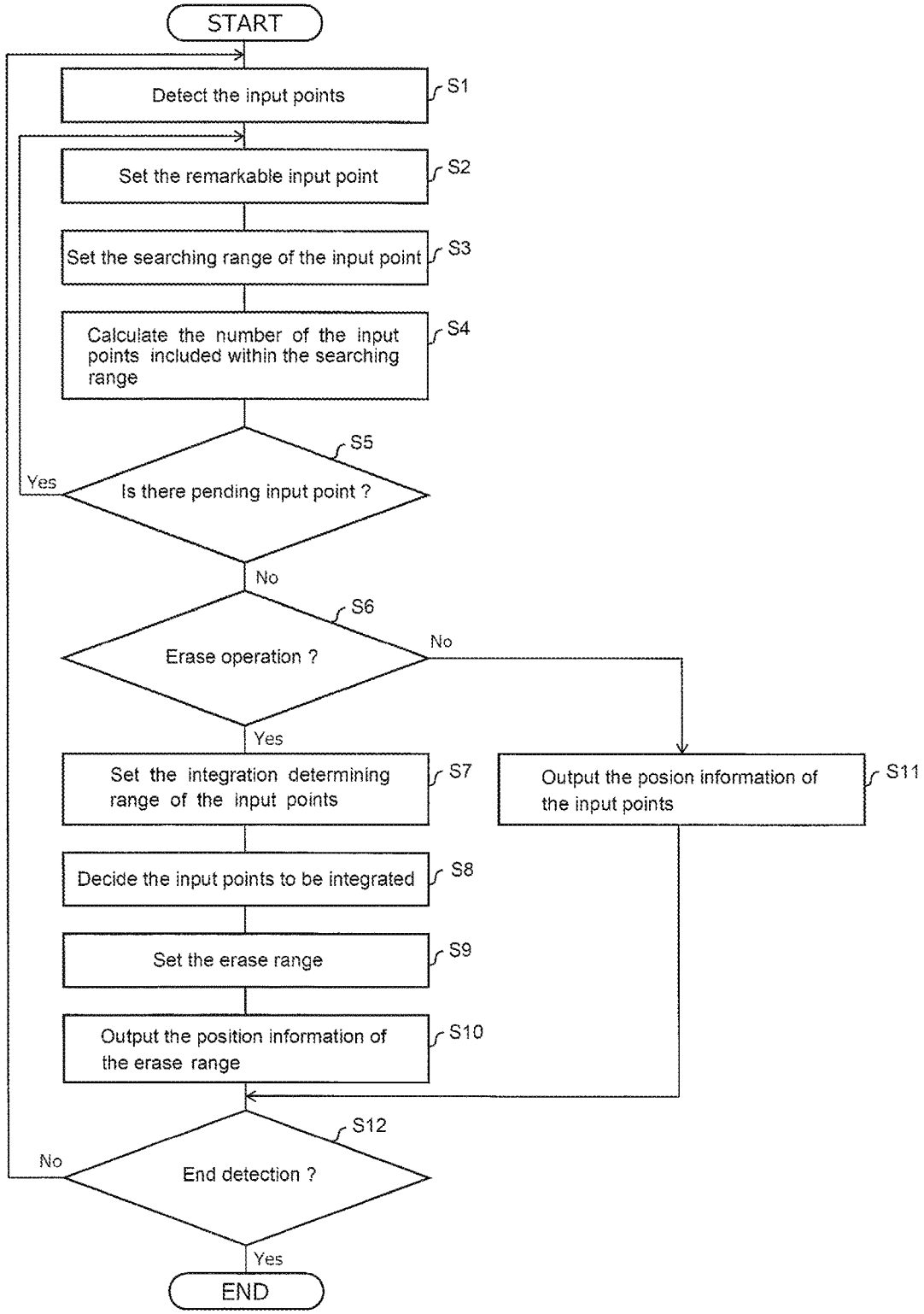
FIG. 3 is a flow chart showing a routine of detection process of an instruction input by a user in the touch panel of FIG. 1.

FIG. 3 is a flow chart showing a routine of detection process of an instruction input by the user in the touch panel 2.

At first, the input point detected by the input point detecting unit 31 is inputted from the panel driving unit 22. On the basis of the signal indicating the capacitance at the crossing point (detection point) of the drive line DL and the sense line SL, the input point (the user's touch operation point) is detected (S1). For example, the input point detecting unit 31 detects the crossing point, at which the capacitance is different by a predetermined value or more from the other crossing points (or a predetermined reference value), as the input point.

Figure 4:
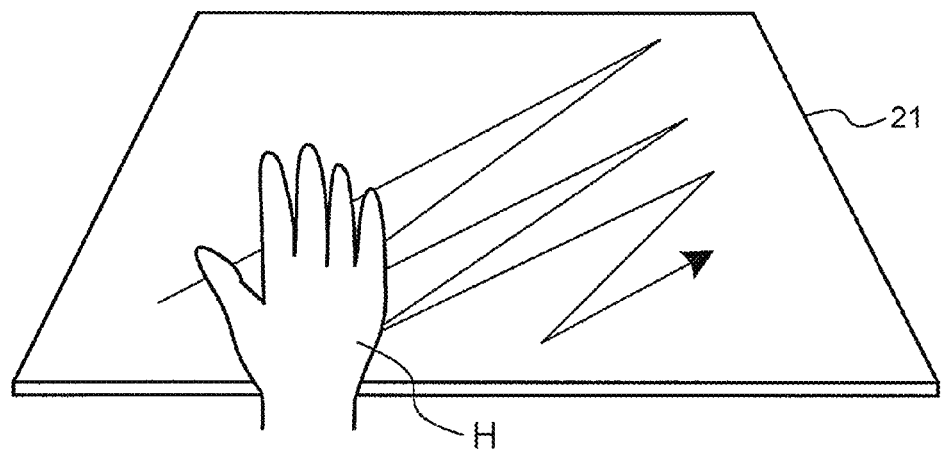
FIG. 4 is a diagram showing an example of the instruction input by the user in the touch panel of FIG. 1.
Figure 5:
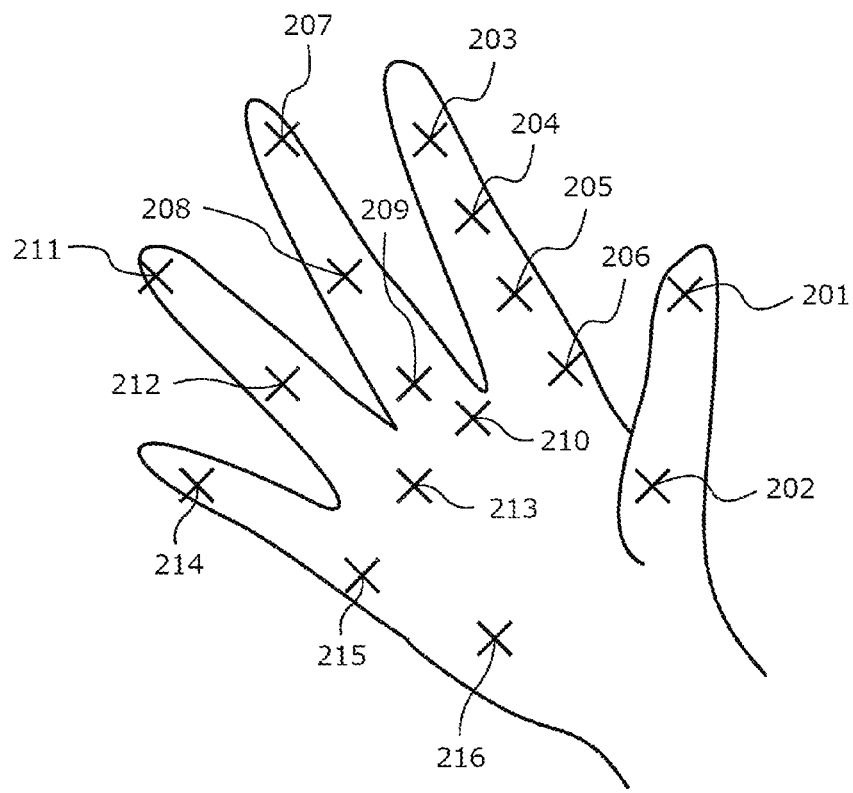
FIG. 5 is a diagram showing a relation between input points detected by the user in the touch panel of FIG. 1 and a hollow of the user's hand.

In addition, as shown in FIG. 4, when the hollow H of the user's hand is contacted with the panel unit 21 for the touch operation, a plurality of input points (e.g. the input points 201-216 shown in marks x in FIG. 5) corresponding to the contact points between the hollow H and the panel unit 21 are detected as the input points.

Next, the region setting unit 34 sets one of the input points detected at S1 as a remarkable input point (S2), and sets a predetermined region centering the remarkable input point as a searching range (S3).

Figure 6:
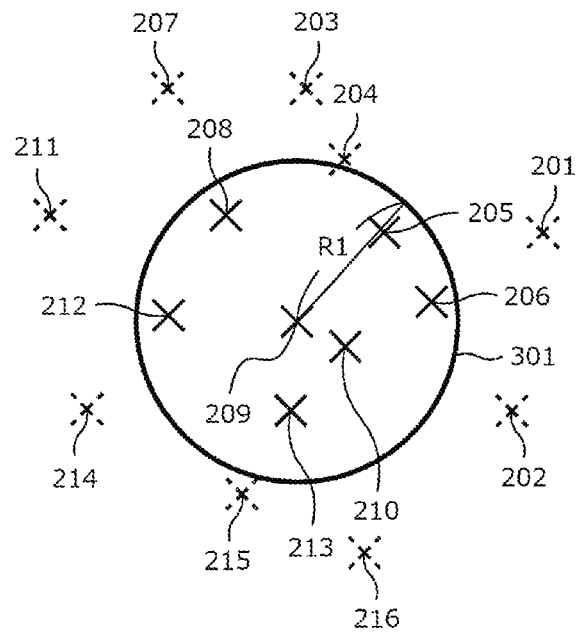
FIG. 6 is a diagram showing a process whether or not an erase-operation is determined on the basis of the input points of FIG. 5.

More particularly, as shown in FIG. 6, the region setting unit 34 sets, as the searching range, a circle 301 of a radius R1 (R1 is 70 mm in this embodiment) centering the remarkable input point (input point 209 in the example of FIG. 6). The size of the radius R1 should not be limited to 70 mm, and it may be optioned depending on the largeness of the user's hand. For example, the value of the radius R1 may be smaller than the average hollow of the user's hand (e.g. 30 mm or more and 150 mm or less). Otherwise, the value of the radius R1 may be one of a circle including the index finger, the middle finger, the ring finger and the little finger of the user's hand.

Then, the input point calculating unit 35 calculates the number of the input points included within the searching range set in S3 (S4). For example, in the example of FIG. 6, six input points of 205, 206, 208, 210, 212 and 213 are calculated.

Next, the region setting unit 34 determines whether or not a pending input point remains which has not been processed with the processes of S2-S4 as the remarkable input points defined by the input points among all the input points detected in S1 (S5). If the pending input points remain, the processes of S2-S4 are performed as the remarkable input point on the basis of one of the pending input points.

Otherwise, if it is determined that no pending input point remains in S5, the mode determining unit 36 determines whether or not the user's touch operation is the erase-operation according to the calculating result of the input points in S4 (S6). That is, the mode determining unit 36 determines whether or not the user's touch operation is the erase-operation according to the concentrated degree of the input points.

According to this embodiment of the present invention, the mode determining unit 36 determines that the user's touch operation is the erase-operation only if the remarkable input point, in which the number of the input points included in the searching range is a first number N1 or more, has a number of a predetermined threshold value or more. And, it determines that the user's touch operation is not the erase-operation only if the remarkable input point has a number less than the predetermined threshold value. Besides, the first number N1 should not be limitative, and, in order to properly distinct between the touch operation by the finger or pen, and the touch operation by the hollow or the back of the hand, it is preferable that the number should be six or more which is more than the number of the fingers. The predetermined threshold value should not be limitative, and it may be properly optioned depending on the largeness of the panel unit 21 and the user's hand.

If the mode determining unit 36 determines that the user's touch operation is the erase-operation in S6, the erase range setting unit 37 sets an integration determining range of the input points (S7).

Figure 7:
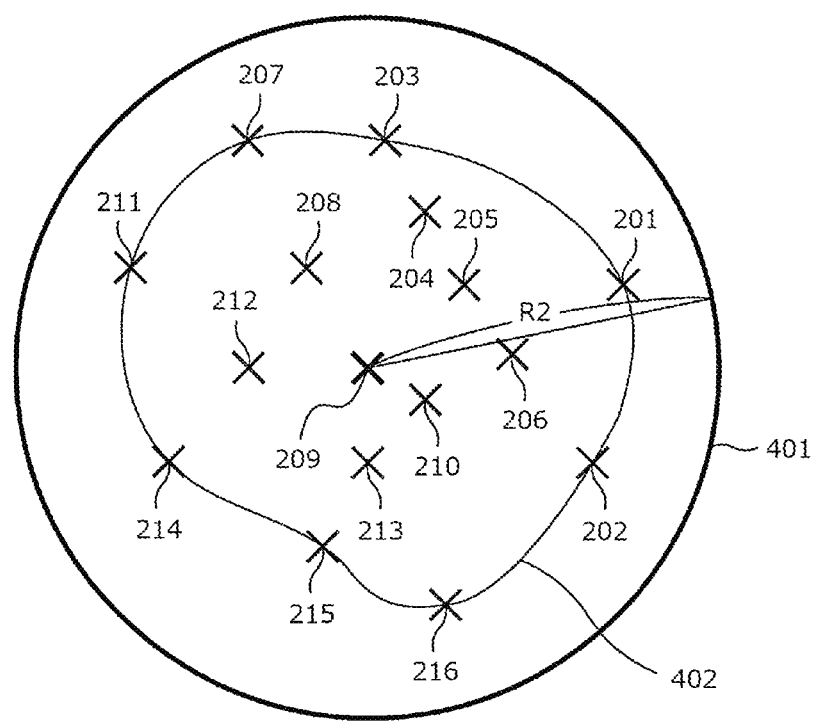
FIG. 7 is a diagram showing a process that an erase range is set on the basis of the input points of FIG. 5.

More particularly, the erase range setting unit 37 sets the input point of which the calculation calculated in S4 is the maximum as a central point (a reference position) of the integration determining range and sets the range which is identical with or wider than the searching range (the circle 301) to determine whether or not the touch operation is the erase-operation, as the integration determining range. According to this embodiment of the present invention, as shown in FIG. 7, the circle 401 of the radius R2 (R2=150 mm) is set as the integration determining range. The size of the radius R2 should not be limited to 150 mm, and, for example, it may be properly optioned depending on the largeness of the user's hand. For example, the size of the radius R2 may be optioned to be a circle for covering all the hollow (or the back) of the user's hand. It may be set to be about double of the searching range. By setting the integration determining range to be wider than the searching range, it is possible to reduce the influence of the noise in setting the erase range, to thereby set the erase range, stably.

In this embodiment of the present invention, the input point, of which the calculation calculated in S4 is the maximum, is set as the central point (the reference position) of the integration determining range (the circle 401). It should not be limited thereto. For example, the central point (the reference position) of the integration determining range may be the center of balance of the input points (the average of the coordinate values), in which the number of the input points included in the searching range in S6 is a first number N1 or more, or the input point nearest to the center of balance of the input points.

The erase range setting unit 37 decides that among the input points detected in S1, the input points included within the integration determining range set in S7 are the input points to be integrated into the erase range (to be included within the erase range) (S8).

Next, the erase range setting unit 37 sets the erase range on the basis of the input points decided in S8 (S9).

Figure 8:
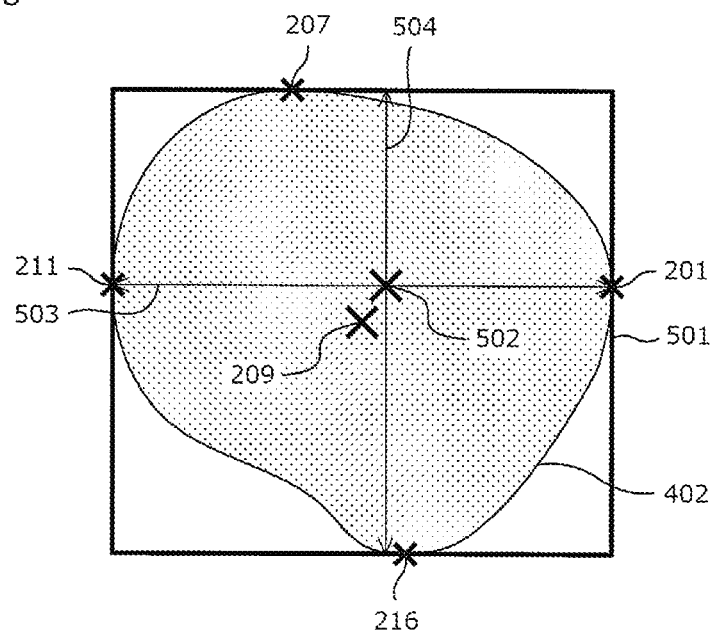
FIG. 8 is a diagram showing a process that an erase range is set on the basis of the input points of FIG. 5.

According to this embodiment of the present invention, on the basis of the coordinate values of the input points decided in S8, the maximum of the x coordinate value, the minimum of the x coordinate value, the maximum of the y coordinate value and the minimum of the y coordinate value are extracted. Accordingly, a rectangular region is set as the erase range defined by the extracted coordinate values (in which the four corners are defined by [the minimum of the x coordinate value, the minimum of the y coordinate value]), [the minimum of the x coordinate value, the maximum of the y coordinate value], [the maximum of the x coordinate value, the minimum of the y coordinate value], and [the maximum of the x coordinate value, the maximum of the y coordinate value]). Thereby, as shown in FIGS. 7 and 8, a rectangle 501 connoting the region (closed curve region) of connecting the input points decided in S8 is set as the erase range. The rectangle 501 circumscribes region 402.

The width 503 of the rectangle 501 in the x direction is represented by a difference between the maximum of the x coordinate value and the minimum of the x coordinate value. The width 504 in the y direction is represented by a difference between the maximum of the y coordinate value and the minimum of the y coordinate value. The coordinate point 502 of FIG. 8 indicates the central coordinate point of the rectangle 501 or the point of the center of balance of the region 402. The coordinate values of the central point of the rectangle 501 can be calculated as ((the minimum of the x coordinate value+the maximum of the x coordinate value) ÷2, (the minimum of the y coordinate value+the maximum of the y coordinate value)÷2). The coordinate values of the point of the center of balance of the region 402 can be calculated as the average of the coordinate values of the input points decided in S8.

After the process of S9, the input information outputting unit 33 outputs the information indicating that it is the erase-operation and the information indicating the erase range to the information processing device 3 (S10).

As for the information indicating the erase range, for example, the reference position (e.g. the central point) of the rectangle 501, the width 503 of the rectangle 501 in the x direction and the width 504 of the rectangle 501 in the y direction are output. Otherwise, the maximum of the x coordinate value, the minimum of the x coordinate value, the maximum of the y coordinate value and the minimum of the y coordinate value of the rectangle as the erase range may be output. Or, the coordinate values of the corners of the rectangle as the erase range may be output.

In this embodiment of the present invention, the shape of the erase range is assumed to be a rectangle. Thereby, the information processing device 3 can easily calculate the erase range. However, the shape of the erase range should not be limited thereto, and, for example, it may be a circle or ellipse connoting the region 402 (closed curve region). The closed curve region (the region 402 as shown in FIGS. 7 and 8) of connecting the input points decided in S8 may be set as the erase range.

When the resolution of the display unit 11 is different from that of the panel unit 21, after the input information outputting unit 33 transfers the information indicating the erase range to the coordinate values of the coordinate system corresponding to the resolution of the display unit 11, the input information outputting unit 33 may output the transferred information to the information processing device 3. Otherwise, the input information outputting unit 33 may output the information indicating the erase range to the information processing device 3 in the form of the coordinate values of the coordinate system corresponding to the resolution of the display unit 11, so that the information processing device 3 may transfer the coordinate values of the coordinate system corresponding to the resolution of the display unit 11, if needed.

After, in S10, the information indicating that it is the erase-operation and the information indicating the erase range are output to the information processing device 3, the touch panel control unit 23 determines whether or not the detection of the touch operation should be ended (S12). If it is not ended, the process of S1 is returned. Determining whether or not the detection of the touch operation should be ended should not be limitative, and, for example, it may be determined whether or not it receives the user's instructions of ending the touch operation, or the user's power switching off instructions. Or, it may be determined whether or not a predetermined time has passed without any touch operation on the panel unit 2.

If in the process S6, it is determined that it is not the erase-operation, the input information outputting unit 33 outputs the position information of the input points detected in S1 to the information processing device 3 (S11). In this case, the information that it is not the erase-operation may be output together with the position information of the input points. When the resolution of the display unit 11 is different from that of the panel unit 21, after the input information outputting unit 33 transfers the information indicating the erase range to the coordinate values of the coordinate system corresponding to the resolution of the display unit 11, the input information outputting unit 33 may output the transferred information to the information processing device 3. Otherwise, the input information outputting unit 33 may output the information indicating the erase range to the information processing device 3 in the form of the coordinate values of the coordinate system corresponding to the resolution of the display unit 11, so that the information processing device 3 may transfer the coordinate values of the coordinate system corresponding to the resolution of the display unit 11, if needed.

When the number of the input points detected in the process of S1 is less than the predetermined threshold value (or, the predetermined value or less which is set to be less than the predetermined threshold value), the processes of S2-S6 may be omitted and the process of S11 may be executed. Accordingly, the calculation process in the case that it is not the erase-operation can be simplified.

After in S11, the position information of the input points is output to the information processing device 3, the touch panel control unit 23 determines whether or not the detection of the touch operation should be ended (S12). If it is not ended, the process of S1 is returned.

Figure 9:
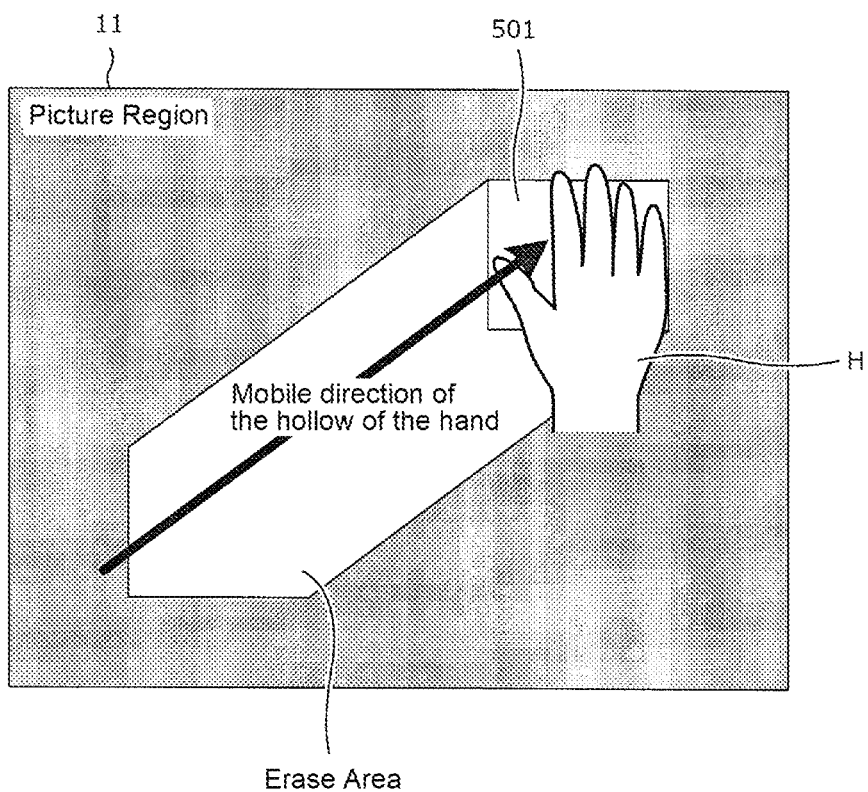
FIG. 9 is a diagram showing a relation between the erase-operation by the user to the touch panel of FIG. 1 and the erase range.

As described above, according to this embodiment of the present invention, the erase-operation determining unit 32 determines whether or not the user's touch operation is the erase-operation by checking the concentrated degree of the detected input points to which the user inputs the touch operations. Further, as shown in FIG. 9, when the user touches the display screen of the display unit 11 (the panel unit 21 of the touch panel 2) with the hollow of the hand or the like, and moves the touch on the display screen, the tracks of the erase range at each frame can be detected, so that the information processing device 3 performs the erase process within the region corresponding to the tracks (the erase range).

Thereby, according to this embodiment of the present invention, it is needless that a touch operation is next operated after any special operation is preliminarily operated indicating that the forthcoming touch operation is to erase the image, or any input instrument is operated which is peculiar to erasing the image as used in the conventional technique. According to this embodiment of the present invention, the erase-operation can be easily performed only by contacting and moving the hollow of the hand or the like onto the display screen.

According to this embodiment of the present invention, the size of the erase range is set again in the process of S9 at each frame. Thereby, it is possible for the user to change the contact range onto the display screen (the panel unit 21) according to any desired erase range and to easily modify the erase range. However, it should not be limited thereto and the size of the erase range once the erase-operation is firstly detected may be kept to be constant in the subsequent erase-operations.

Second Embodiment

A second embodiment of the present invention will be described. For convenience of explanation, like elements to the first embodiment are denoted by like reference numerals in the second embodiment and their explanation is omitted.

In the first embodiment of the present invention, it is explained that the user's touch operation is determined to be the erase-operation only if the remarkable input point, in which the number of the other input points included in the searching range is a first number N1 or more, is calculated and has a number of the predetermined threshold value or more, and that the user's touch operation is determined not to be the erase-operation only if the remarkable input point, in which the number of the input points is the first number N1 or more, has a number less than the predetermined threshold value.

On the contrary, according to another embodiment of the present invention, a weighting coefficient is assigned to each of the input points, according to the distance from the central point, with respect to the other input points included in the searching range centering that input point, the searching range having a predetermined size. The weighting coefficients assigned to the input points are summed and the erase-operation is determined only if the input points, at which the total is a first number V1 or more, has a number of a predetermined threshold value or more.

Figure 10:
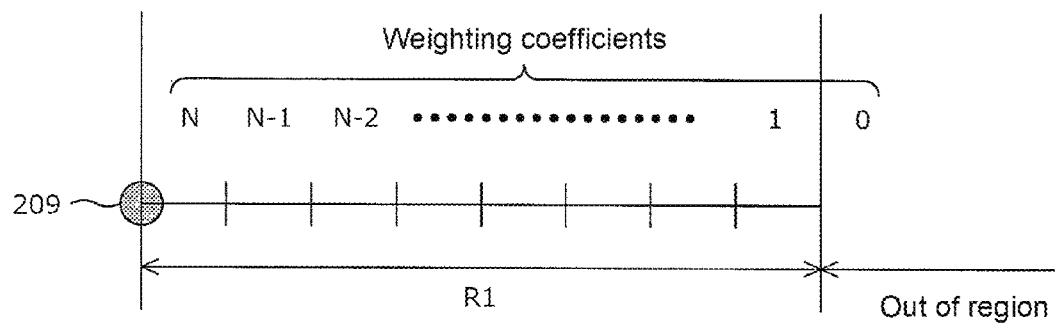
FIG. 10 is a diagram showing weighting coefficients used to the process whether or not the erase-operation is determined on the basis of the input points by the user in another touch panel according to another embodiment of the present invention.

More particularly, as shown in FIG. 6, in the process of S3, the region setting unit 34 sets, as the searching range, the circle 301 of the radius R1 centering the remarkable input point (input point 209 in the example of FIG. 6). Then, as shown in FIG. 10, the radius R1 is divided equally into N segments (N is an integer of 2 or more). As shown in FIG. 10, with respect to the N segments into which the radius R1 is divided equally, the weighting coefficient of N is assigned to the segment closest to the central point (the input point 209) of the circle 301, the weighting coefficient of N-1 is assigned to the second closest segment, and the weighting coefficient of N-2 is assigned to the third closest segment, in such a manner that a smaller weighting coefficient is assigned to a segment farther from the central point of the circle. The weighting coefficient of 1 is assigned to the farthermost segment. The weighting coefficient of 0 is assigned to the segment farther than the radius R1.

Next, in the process of S4, the input point calculating unit 35 assigns to each of the input points, the weighting coefficient which is according to the segment to which this input point belongs, and calculates the total of the weighting coefficients assigned to the input points.

The processes of S2-S5 are executed with respect to all the input points, and the total is calculated at each of the input points when the input points are treated as the remarkable input points. Then, the mode determining unit 36 determines that the user's touch operation is the erase-operation only if the remarkable input point, in which the number of the input points included in the searching range is the first number V1 or more, has a number of the predetermined threshold value or more. And, it determines that the user's touch operation is not the erase-operation only if the remarkable input point has a number less than the predetermined threshold value. The subsequent processes are the same as the first embodiment. That is, the mode determining unit 36 determines whether or not the user's touch operation is the erase-operation according to the concentrated degree of the input points.

Thereby, when the user moves the hollow of the hand or the like onto the display screen in order to perform the erase-operation, for example, even if a wrist watch, bracelet, clothing, button of the user or the like is contacted with the display screen, an undesired input point owing to this type of touch operation can be prevented from being within the erase range, so that the erase range can be stabilized.

Third Embodiment

A third embodiment of the present invention will be described. For convenience of explanation, like elements to the above-described embodiment are denoted by like reference numerals in the third embodiment and their explanation is omitted.

In the first embodiment of the present invention, the largeness of the searching range (the circle 301) of the input points set in the process of S3 is constant.

On the contrary, in the third embodiment of the present invention, while the erase-operations are continued, the largeness of the searching range of the input points is made to be larger than the searching range (the circle 301) before the erase-operation is determined. For example, while the erase-operations are continued, the radius of the circle as the searching range of the input points is made to be double or more which is larger than the radius of the original searching range (the circle 301) before the erase-operation is determined.

Thereby, while the erase-operations are continued, for example, even if the hollow of the user's hand or the like is tentatively separated from the display screen (the panel unit 21), the erase-operations can be prevented from being canceled contrary to the user's will, to thereby perform the erase-operations, stably.

In addition, while the erase-operations are continued, the predetermined threshold value used to determine whether or not the erase-operation is set in the process of S6 may be made to be smaller (e.g. 1) than the original threshold value. Further, while the erase-operations are continued, the predetermined number N1 used to evaluate the concentrated degree of the input points may be made to be smaller (e.g. 1) than the original predetermined number N1.

Thereby, while the erase-operations are continued, for example, even if the hollow of the user's hand or the like is tentatively separated from the display screen (the panel unit 21), the erase-operations can be prevented from being canceled contrary to the user's will, to thereby perform the erase-operations, stably.

Fourth Embodiment

A fourth embodiment of the present invention will be described. For convenience of explanation, like elements to the above-described embodiment are denoted by like reference numerals in the fourth embodiment and their explanation is omitted.

In the first embodiment of the present invention, the largeness of the integration determining range (the circle 401) set in the process of S8 is made to be constant, and the input points included within the integration determining range in the process of S9 are those to be included within the erase range.

On the contrary, according to the fourth embodiment of the present invention, while the erase-operations are continued, when the erase range setting unit 37 sets the erase range of the present time (n-th frame), the erase range setting unit 37 detects the mobile direction of the integration determining range (the circle 401) from the time when the erase-operation of the last time ((n−1)th frame) is set. Accordingly, the input points positioned at the outside of the integration determining range (the circle 401) of the present time and positioned in the mobile direction to the integration determining range (the circle 401) of the present time are included within the erase range (the rectangle 501) of the present time. For example, the mobile direction of the integration determining range can be determined on the basis of the tracks of the reference position of the integration determining range.

Thereby, when the user moves the hollow of the hand or the like onto the display screen in order to perform the erase-operation, for example, even if the hollow of the user's hand or the like is tentatively separated from the display screen (the panel unit 21) or the touch by the finger is unstable, the increase or decrease of the number of the input points to be included within the erase-operations can be prevented from occurring, to thereby perform the erase-operations, stably.

While the erase-operations are continued, among the input points positioned at the outside of the integration determining range, the input points positioned in the mobile direction of the hollow of the user's hand or the like, and positioned less than a predetermined distance from the integration determining range may be included in the erase range, and, on the other hand, the input points positioned farther than the predetermined distance from the integration determining range may not be included in the erase range.

Fifth Embodiment

A fifth embodiment of the present invention will be described. For convenience of explanation, like elements to the above-described embodiment are denoted by like reference numerals in the fifth embodiment and their explanation is omitted.

In the first embodiment of the present invention, the largeness of the integration determining range (the circle 401) set in the process of S8 is made to be constant, and the input points included within the integration determining range in the process of S9 are those to be included within the erase range. With respect to the input points not included within the integration determining range, the input information outputting unit 33 outputs the position information of these input points to the information processing device 3.

On the contrary, in the fifth embodiment of the present invention, while the erase-operations are continued, the input points positioned in the periphery (e.g. within the predetermined distance from the outside edge of the erase range) of the erase range (the rectangle 501) are excluded (canceled) from the input points, so that the position information of these input points is not output to the information processing device 3.

Thereby, when the user moves the hollow of the hand or the like onto the display screen in order to perform the erase-operation, for example, even if the wrist watch, bracelet, clothing, button of the user or the like is contacted with the display screen, an undesired input point owing to this type of touch operation can be prevented from being detected as the user's operation inputs (e.g. the picture operation or the optional menu operation).

Further, by combining the fourth embodiment and the fifth embodiment of the present invention, the input points positioned in the mobile direction of the hollow of user's hand or the like to the integration determining range may be included within the erase range and, among the input points other than those positioned in the mobile direction of the hollow of user's hand or the like to the integration determining range, the input points positioned within the predetermined distance from the integration determining range may be excluded from the input points and their position information may not be output.

Sixth Embodiment

A sixth embodiment of the present invention will be described. For convenience of explanation, like elements to the above-described embodiment are denoted by like reference numerals in the sixth embodiment and their explanation is omitted.

Figure 11:
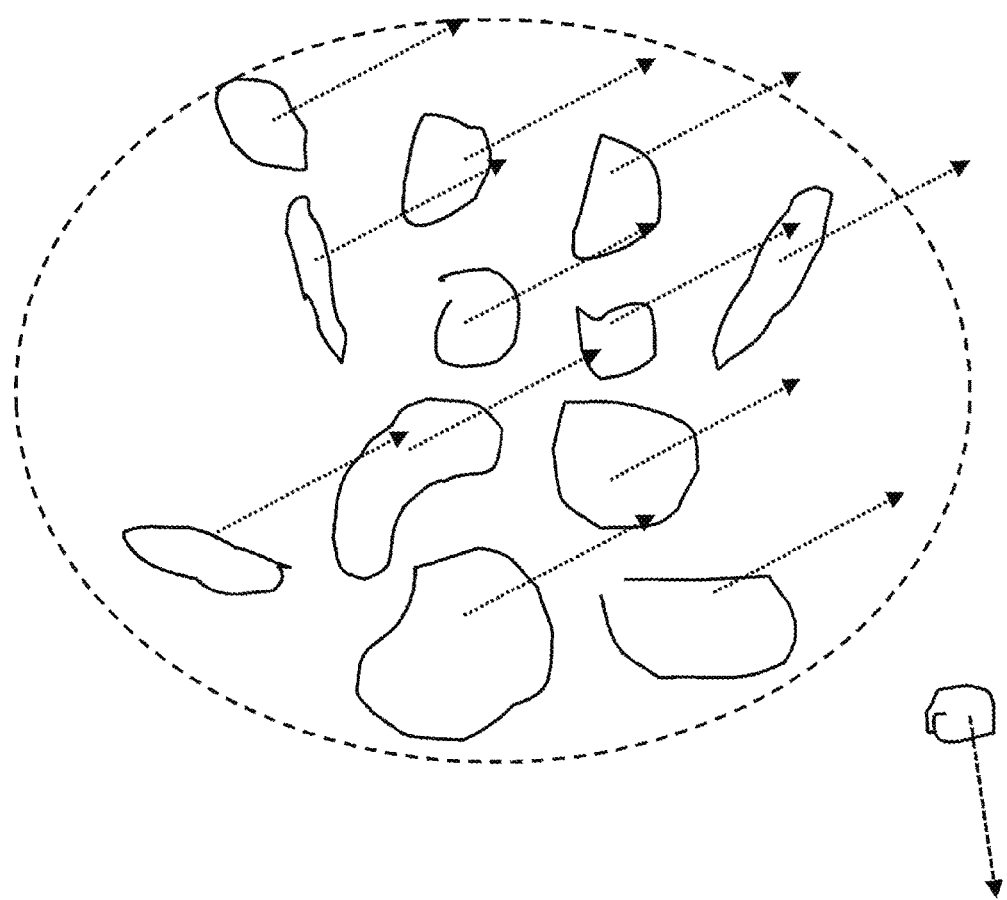
FIG. 11 is a diagram showing a concept that the erase range is set on the basis of the input points by the user according to a sixth embodiment of the present invention.

FIG. 11 is a diagram showing a concept that the erase range is set on the basis of the input point by the user according to the sixth embodiment of the present invention. As shown in FIG. 11, according to the sixth embodiment of the present invention, the mobile vectors (see, arrows in FIG. 11) of the detected input points are calculated at a predetermined time, so that the input points (see, the input points included in the broken line of FIG. 11) at which the mobile vectors are within a predetermined deflection are treated as one object, and a region including these input points is set as the erase range.

Figure 12:
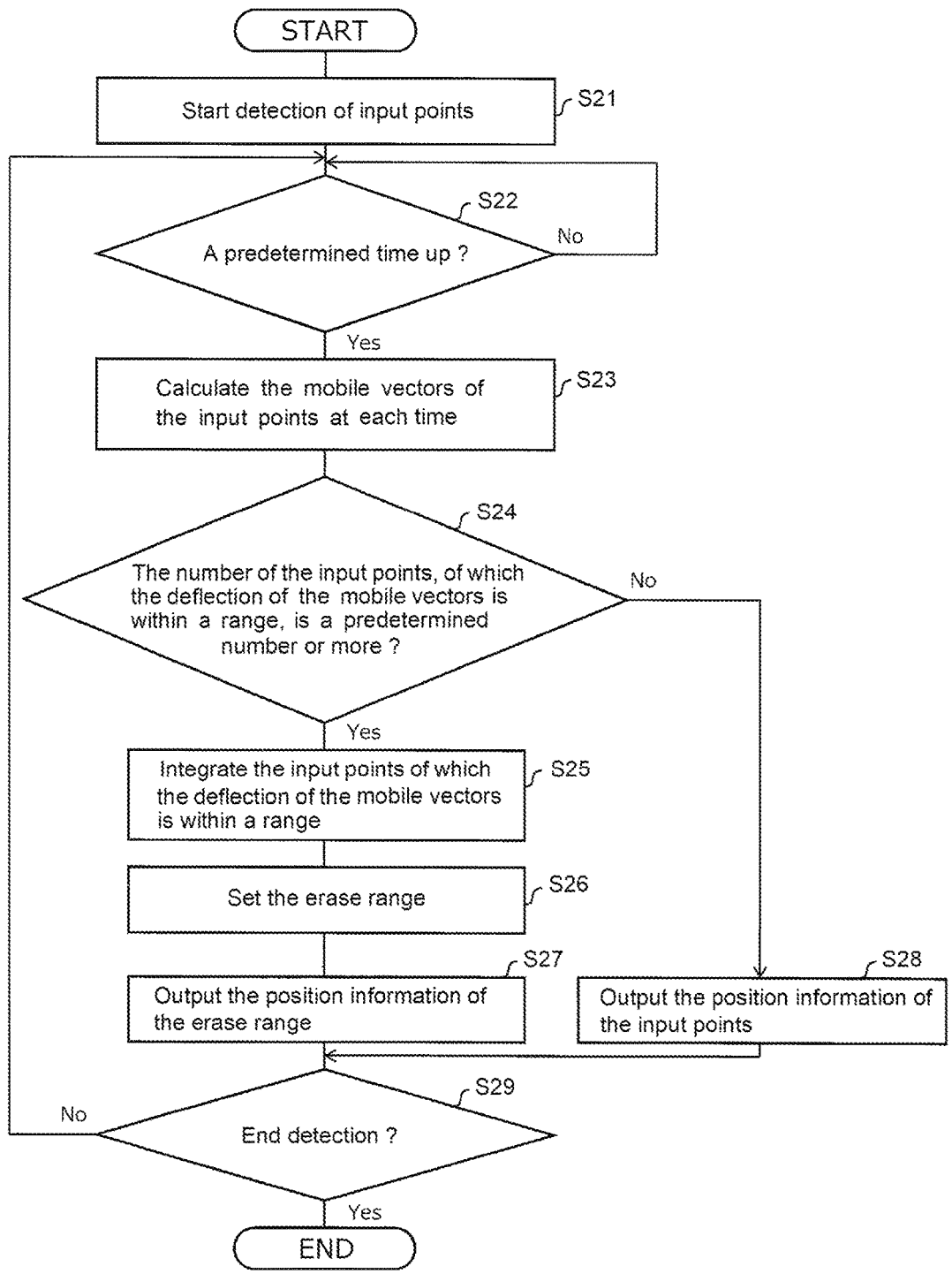
FIG. 12 is a flow chart showing a routine of detection process of instruction inputs by the user according to a sixth embodiment of the present invention.

FIG. 12 is a flow chart showing a routine of detection process of instruction inputs by the user according to a sixth embodiment of the present invention.

At first, the input point detected by the input point detecting unit 31 is inputted from the panel driving unit 22. On the basis of the signal indicating the capacitance at the crossing point (detection point) of the drive line DL and the sense line SL, the detection of the input point (the user's touch operation point) at each cycle (e.g. 5 msec) is started (S21). The detection result of the input point is temporarily stored within a storage (not shown).

Further, the region setting unit 34 monitors the passage of the predetermined time (e.g. 0.1 sec) (S22) since starting the process of detecting the input point (or, since the previous calculation of the mobile vector). When it determines this passage, the mobile vector (i.e. the mobile vector from the coordinate values of the input points before the passage of the predetermined time to the coordinate values of these input points after the passage of the predetermined time) at each certain time is calculated (S23).

The mode determining unit 36 determines whether or not the number of the input points, at which the deflection of the mobile vector is within a predetermined range (e.g. the range of ±3 mm each in the x direction and the y direction), is a second predetermined number N2 (e.g. 2) or more (S24). When it is determined that it is the second predetermined number N2 or more in S24, the mode determining unit 36 determines that it is the erase-operation. When it is determined that it is less than the second predetermined number N2, the mode determining unit 36 determines that it is not the erase-operation.

When, in S24, the number of the input points, at which the deflection of the mobile vector is within a predetermined range, is the second predetermined number N2 or more, the erase range setting unit 37 integrates (groups) the input points at which the deflection of the mobile vector is within a predetermined range.

Figure 13:
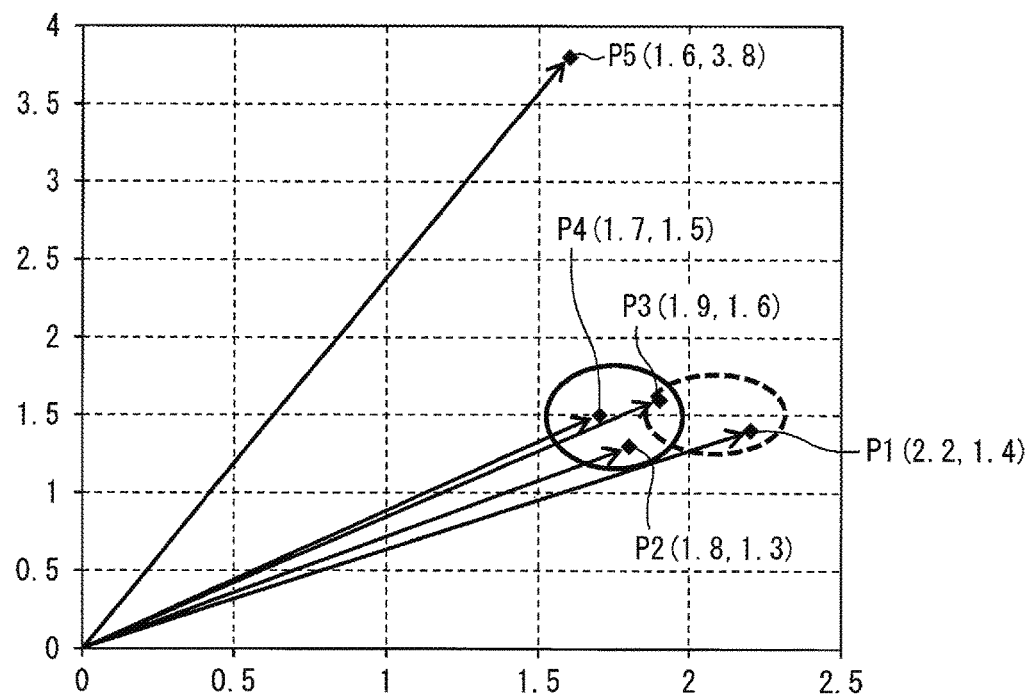
FIG. 13 is a diagram showing a process whether or not the erase-operation is determined on the basis of the input points according to a sixth embodiment of the present invention, and is a diagram showing a process that the erase range is set on the basis of the input points by the user.

FIG. 13 is a diagram showing a process whether or not the erase-operation is determined on the basis of the input points, and is a diagram showing a process that the erase range is set on the basis of the input points. In the example of FIG. 13, the input points P1-P5 are detected in a period from t0=0 sec to t1=0.1 sec, and the mobile vectors (x, y) of the input points P1-P5 in a period from t0 to t1 are as follows:

P1=(2.2, 1.4), P2=(1.8, 1.3), P3=(1.9, 1.6), P4=(1.7, 1.5), P5=(1.6, 3.8).

At first, the mode determining unit 36 sorts (searches) the x coordinate values to extract the group of the input points included within the deflection of 0.3 mm, so that in the example of FIG. 13, the group of [P1, P3] and the group of [P2, P3, P4, P5] are extracted.

Next, with respect to the groups extracted on the basis of the x coordinate values, the mode determining unit 36 sorts the y coordinate values to also extract the group of the input points included within the deflection of 0.3 mm, so that in the example of FIG. 13, the group (group 1) of [P1, P3] and the group (group 2) of [P2, P3, P4, P5] are extracted.

Further, with respect to the groups extracted on the basis of the x coordinate values and the y coordinate values, the mode determining unit 36 compares the number of the input points included in each group to extract the group in which the number of the input points is more. In the example of FIG. 13, the group 2 is extracted, in which the number of the input points is more, between the groups 1 and 2. Next, the mode determining unit 36 determines whether or not the number of the input points included within the extracted group (the group 2 in the example of FIG. 13) is the second predetermined number N2 or more. If it is determined that it is the second predetermined number N2 or more, the erase range setting unit 37 integrates the input points included within the extracted group.

After the erase range setting unit 37 integrates the input points at which the deflection of the mobile vector is within a predetermined range, the mode determining unit 36 may calculate the mobile vectors of the extracted group on the basis of the average of the input points included in the extracted group, so that they are treated as one object.

Further, if input point (the touch point) is newly added, the mobile vector of the new input point may be compared with the mobile vector of the existing input point (or, the mobile vector of the integrated group) to determine whether or not the new input point is added to the integrated group of the input points.

For example, when, in the example of FIG. 13, the new input point P6 (not shown) in which the mobile vector is P6=(1.7, 1.6) is generated at time t2, assuming that the mobile vector of the group 2 is GP2=(1.7, 1.4), the input points P1 and P5 are excluded from the group 2 since they are not included within the deflection of ±0.3 mm, and the input point P6 is included within the group 2 since the x coordinate value and the y coordinate value of the P6 are included within the deflection of ±0.3 mm. The input points P1 and P5 not included in the group 2 are considered to be an input other than the erase-operation. The mobile vector of the integrated group is calculated, for example, on the basis of the average of the coordinate values of the input points included within the extracted group.

After, in S25, the input points, at which the deflection of the mobile vectors are within the predetermined range, are integrated, the erase range setting unit 37 sets the erase range on the basis of the integrated input points (S26).

More particularly, the erase range setting unit 37 extracts the maximum of the x coordinate value, the minimum of the x coordinate value, the maximum of the y coordinate value and the minimum of the y coordinate value on the basis of the coordinate values of the integrated input points in S25, so that a rectangular region defined by these extracted coordinate values is set as the erase range.

Further, the input information outputting unit 33 outputs the information indicating that it is the erase-operation and the information indicating the erase range to the information processing device 3 (S27).

As for the information indicating the erase range, the reference position (e.g. the central point) of the rectangle 501, the width 503 of the rectangle 501 in the x direction and the width 504 of the rectangle 501 in the y direction are output. Otherwise, the maximum of the x coordinate value, the minimum of the x coordinate value, the maximum of the y coordinate value and the minimum of the y coordinate value of the rectangle as the erase range may be output. Or, the coordinate values of the corners of the rectangle as the erase range may be output.

Then, the touch panel control unit 23 determines whether or not the detection of the touch operation should be ended (S29). If it is not ended, the process of S22 is returned. Determining whether or not the detection of the touch operation should be ended should not be limitative, and, for example, it may be determined whether or not it receives the user's instructions of ending the touch operation, or the user's power switching off instructions, or by determining the state that the touch operation to the touch panel 2 has been ended (touch-up condition). Or, it may be determined whether or not a predetermined time has passed without any touch operation on the panel unit 2.

When, in the process of S24, the mode determining unit 36 determines that it is less than the second predetermined number N2 (it is not the erase-operation), the input information outputting unit 33 outputs the position information of the input points detected at each cycle to the information processing device 3 (S28), and is advanced to the process of S29.

As described above, according to the sixth embodiment of the present invention, the region, which includes the input points at which the mobile vector of each input point calculated at each time is within a predetermined deflection, is set as the erase range.

Thereby, the input points to be included in the erase range can be decided according to the mobility of the input points. Therefore, even if another input operation (the picture operation or the like) different from the erase-operation is conducted near to the erase range, the erase-operation and another input operation can be differentiated to prevent misjudgment.

Seventh Embodiment

A seventh embodiment of the present invention will be described. For convenience of explanation, like elements to the above-described embodiment are denoted by like reference numerals in the seventh embodiment and their explanation is omitted.

Figure 14:
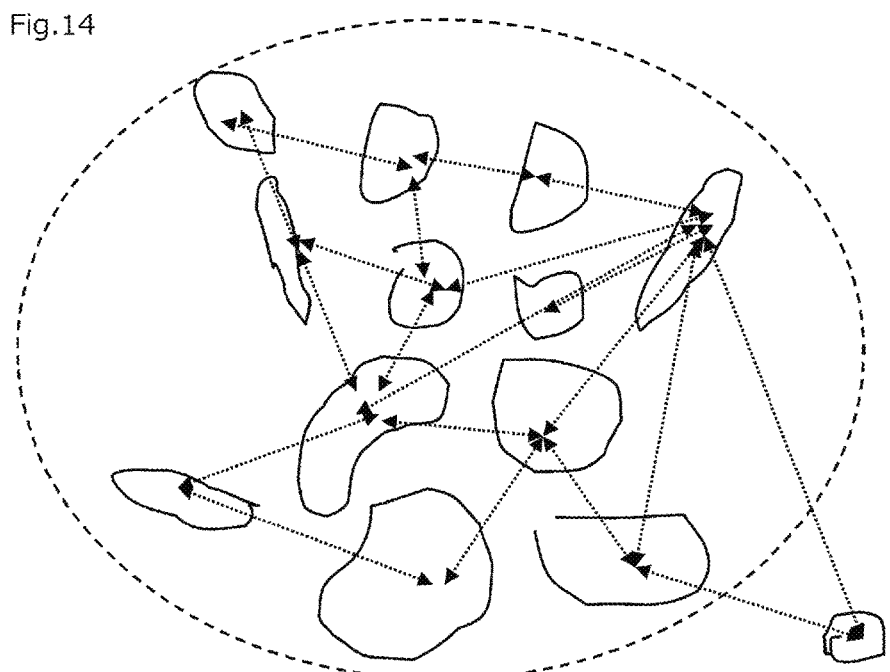
FIG. 14 is a diagram showing a concept that the erase range is set on the basis of the input points by the user according to a seventh embodiment of the present invention.

FIG. 14 is a diagram showing a concept that the erase range is set on the basis of the input points by the user. As shown in FIG. 14, according to the seventh embodiment of the present invention, with respect to the input points detected, the variation of the distance between the adjacent input points in a predetermined time is calculated, so that the input points, at which the variation of the distance is a second predetermined value V2 or less, are treated as one object, and the region including these input points is set as the erase range.

Figure 15:
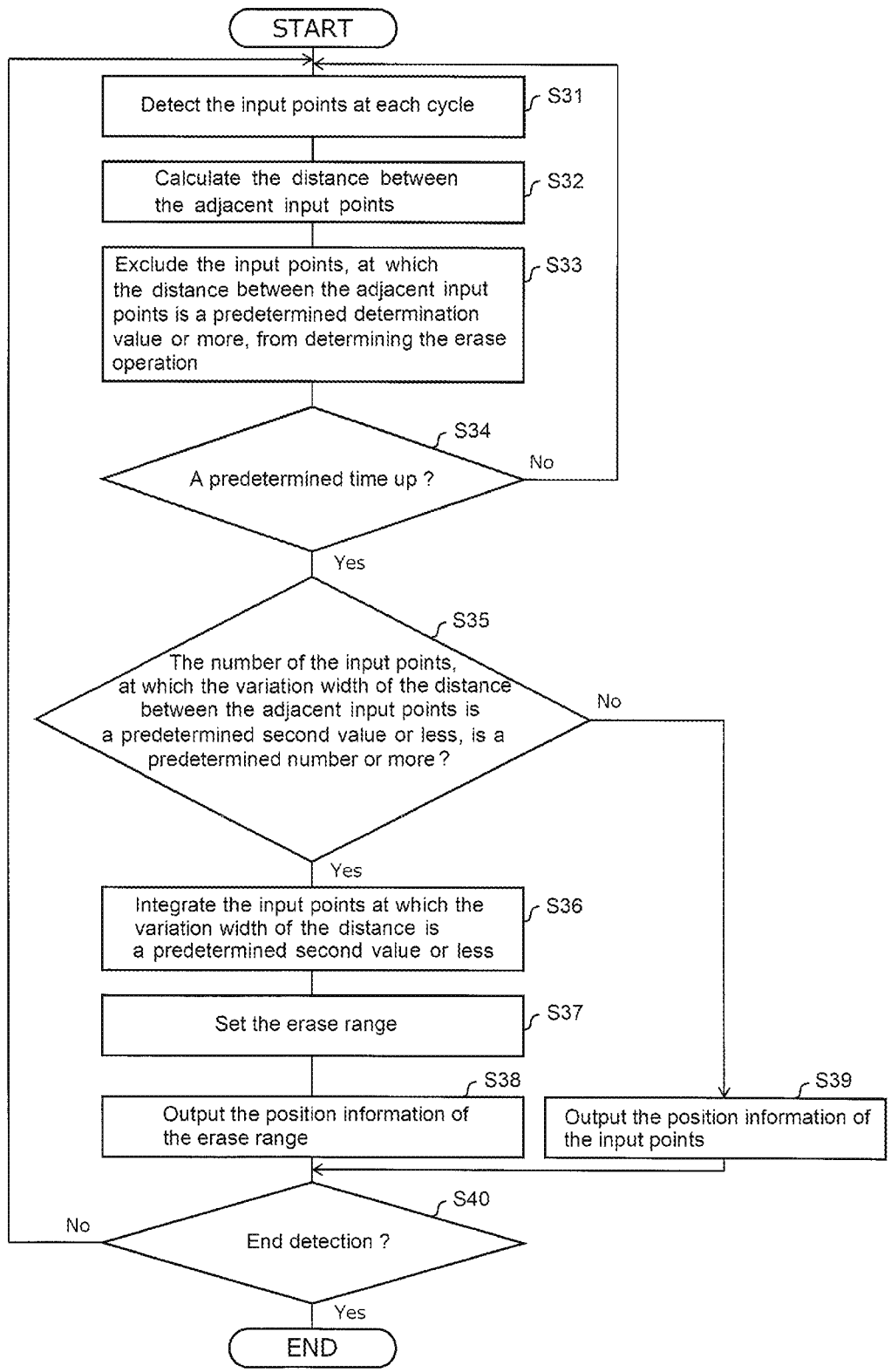
FIG. 15 is a flow chart showing a routine of detection process of instruction inputs by the user according to a seventh embodiment of the present invention.

FIG. 15 is a flow chart showing a routine of detection process of the instruction inputs by the user.

At first, the input point detected by the input point detecting unit 31 is inputted from the panel driving unit 22. On the basis of the signal indicating the capacitance at the crossing point (detection point) of the drive line DL and the sense line SL, the input point (the user's touch operation point) is detected at each cycle (e.g. 5 msec) (S31). The detection result of the input point is temporarily stored within a storage (not shown).

Next, the mode determining unit 36 calculates the distance (see, the arrows in FIG. 14) between the adjacent input points detected in S31 (S32). The calculation result of the distance is temporarily stored within a storage (not shown).

Next, the mode determining unit 36 excludes the input points, at which the distance between the adjacent input points is the predetermined detection value (e.g. 15 cm) or more, from the determination process whether or not it is the erase-operation (S33).

Next, the mode determining unit 36 determines whether or not a predetermined time (e.g. 50 msec) has been passed since the input points start to be continuously detected (S34). When it is determined that the predetermined time has not been passed, the process of S31 is returned.

On the other hand, when it is determined that the predetermined time has been passed, the mode determining unit 36 determines whether or not the number of the input points, at which the variation width in the distance between the adjacent input points in a predetermined time is the second predetermined value V2 (e.g. 2 mm) or less, is a third predetermined number N3 (e.g. 2) or more (S35). If it is determined in S35 that it is the third predetermined number N3 or more, the mode determining unit 36 determines that it is the erase-operation, and if it is determined that it is less than the third predetermined number N3, the mode determining unit 36 determines that it is not the erase-operation.

If, in S35, the mode determining unit 36 determines that it is the third predetermined number N3 or more, the erase range setting unit 37 integrates the input points at which the variation width in the distance between the adjacent input points is the second predetermined value V2 or less (S36).

Figure 16:
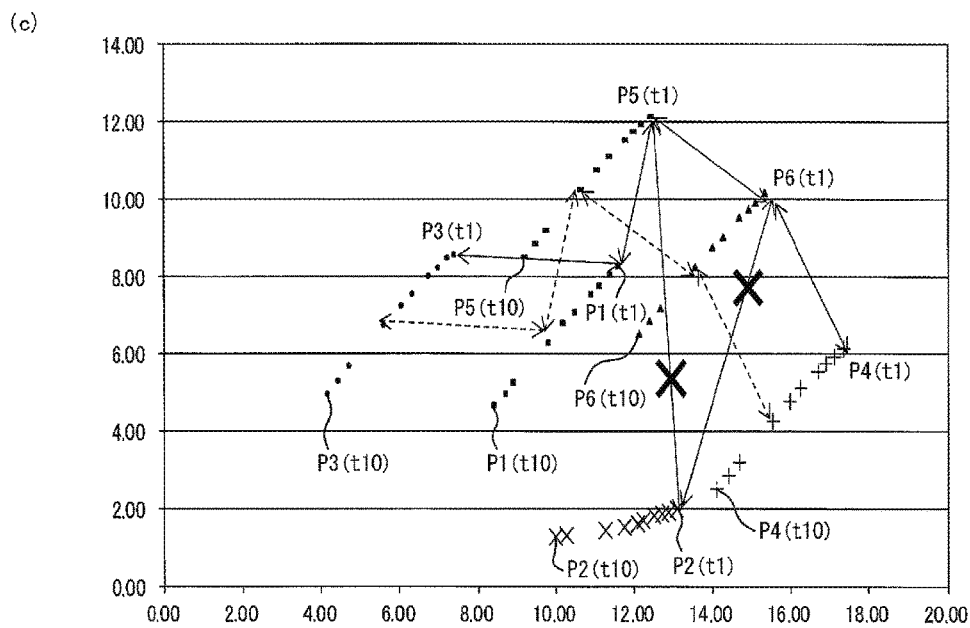
FIG. 16 is a diagram showing a process whether or not the erase-operation is determined on the basis of the input points according to a seventh embodiment of the present invention, and is a diagram showing a process that: the erase range is set on the basis of the input points by the user, wherein (a) is a coordinate detection value per a predetermined cycle at each input point, (b) is a distance between adjacent input points per a predetermined cycle, and (c) is an erase region set on the basis of each input point.

FIG. 16 is a diagram showing a process whether or not the erase-operation is determined on the basis of the input points, and is a diagram showing a process that the erase range is set on the basis of the input points by the user, wherein (a) is a coordinate detection value per a predetermined cycle at each input point, (b) is a distance between adjacent input points per a predetermined cycle, and (c) is an erase region set on the basis of each input point. The example of FIG. 16, the input points P1-P6 are detected in a period from t0=0 to t10=50 msec.

The mode determining unit 36 determines at each cycle whether there are existed the input points at which the distance between the adjacent input points is a predetermined detection value (e.g. 15 cm) or more, and if there are existed, these input points are excluded when the erase-operation is determined.

More particularly, the mode determining unit 36 sorts (searches) the input points on the basis of the x coordinate values. In the example of FIG. 16, the input points P3, P1, P5, P2, P6 and P4 are listed in the order that the x coordinate values are smaller. The difference of the x coordinate values between the input point P3 at which the x coordinate value is the minimum and the input point P4 at which the x coordinate value is the maximum does not exceed the predetermined detection value (15 cm), so that no input point is excluded from the determination process of the erase-operation. Similarly, when it sorts the input points on the basis of they coordinate values, the input points P2, P4, P1, P3, P6 and P5 are listed in the order that the y coordinate values are smaller. The difference of the y coordinate values between the input points does not exceed the predetermined detection value (15 cm), so that no input point is excluded from the determination process of the erase-operation.

Based on the sort result of the input points on the basis of the x coordinate values, the mode determining unit 36 calculates the distances of the adjacent input points (the distances between P3-P1, P1-P5, P5-P2, P2-P6, and P6-P4). This calculation of the adjacent input points is continued in a time from t1-t10. When there is the input point at which the variation width Δ max (the difference between the minimum (min) and the maximum (max)) of the distances of the input points calculated in this time is the second predetermined value V2 (e.g. 2 mm) or more, the distances are re-calculated by excluding that input point. In the example of FIG. 16, the input point P2 is excluded.

Then, the erase range setting unit 37 integrates the input points at which the variation width in the distance between the adjacent input points is the second predetermined value V2 (S36) or less. If there are a plurality of groups of the input points at which the variation width in the distance between the adjacent input points is the second predetermined value V2 or less, the group having a great number of input points is selected and integrated.

Then, the erase range setting unit 37 sets the erase range on the basis of the coordinate values of the integrated input points (S37). More particularly, the erase range setting unit 37 extracts the maximum of the x coordinate value, the minimum of the x coordinate value, the maximum of the y coordinate value and the minimum of the y coordinate value on the basis of the coordinate values of the integrated input points, so that a rectangular region defined by these extracted coordinate values is set as the erase range.

Further, the input information outputting unit 33 outputs the information indicating that it is the erase-operation and the information indicating the erase range to the information processing device 3 (S38).

Then, the touch panel control unit 23 determines whether or not the detection of the touch operation should be ended (S40). If it is not ended, the process of S31 is returned.

When, in the process of S35, the mode determining unit 36 determines that the number of the input points, at which the variation width in the distance between the adjacent input points is less than the second predetermined value V2, is less than a third predetermined number N3 (it is not the erase-operation), the input information outputting unit 33 outputs the position information of the input points detected in S31 to the information processing device 3 (S39), and is advanced to the process of S40.

After the input points are integrated to set the erase range, the coordinate values of the erase range are calculated on the basis of the coordinate values of the integrated input points detected at each cycle. In addition, the area of the rectangular region defined by the maximum of the x coordinate value, the minimum of the x coordinate value, the maximum of the y coordinate value and the minimum of the y coordinate value of the integrated input points is continuously monitored, so that when the area is changed more than a predetermined proportion from the original area of the erase range, the integration process of the input points and the setting process of the erase range may be resumed. Thereby, even if the input points to be integrated are increased or decreased after setting the erase range, the erase range corresponding to the touch operations can be set, properly. Further, in this way, until the area is enlarged more than a predetermined condition, it is only to set the position of erase range on the basis of the coordinate values of the integrated input points, so that the calculation process of the distances between the input points can be omitted to thereby simplify the calculation process.

Figure 17:
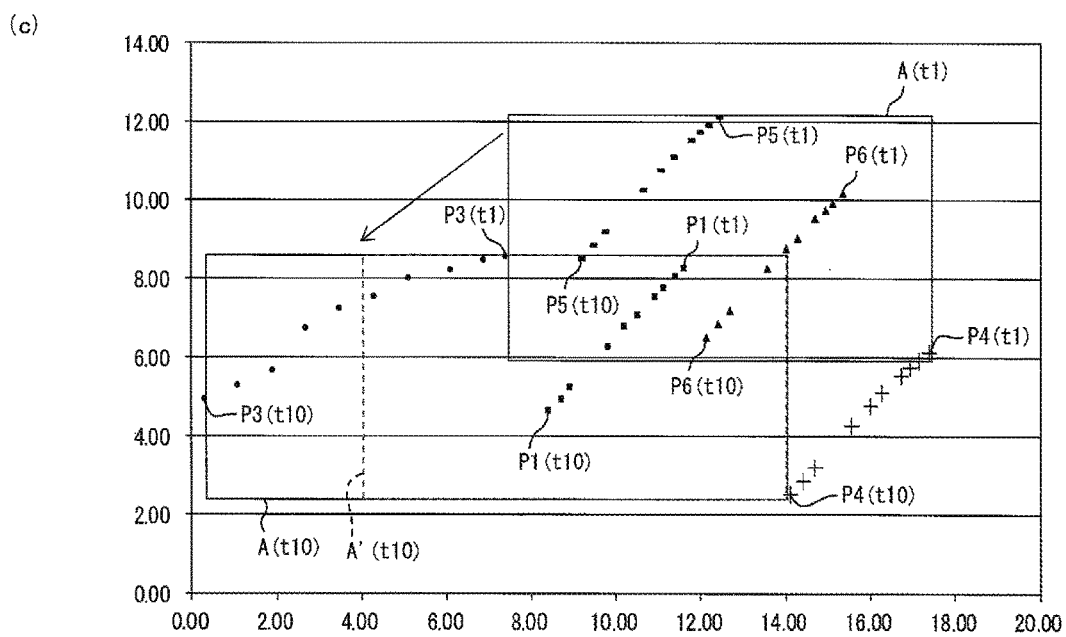
FIG. 17 is a diagram showing a process after the erase range is set on the basis of the input points by the user according to a seventh embodiment of the present invention, wherein (a) is a coordinate detection value per a predetermined cycle at each input point, (b) is a distance between adjacent input points per a predetermined cycle, and (c) is an erase region set on the basis of each input point.

For example, as shown in FIG. 17, the input points P1(t0), P3(t0), P4(t0), P4(t0), P5(t0) and P6(t0) are integrated at the time t0. The area of the rectangular region A(t0) defined by the maximum of the x coordinate value, the minimum of the x coordinate value, the maximum of the y coordinate value and the minimum of the y coordinate value of these integrated input points are calculated and stored in a storage (not shown).

Then, the area of the rectangular region A defined by the input points P1 and P3-P6 is monitored, so that when the area of the rectangular region A is changed from the area in the time t0 more than a predetermined condition, it is decided that there is existed the input point at which the distance from the other input points is largely changed. The integrated input points are set again.

In the case of FIG. 17, the input point P3 is gradually separated from the other input points, so that the area rectangular region A is gradually enlarged from the area of the rectangular region A(t0) in the time t0 to the area of the rectangular region A(t10) in the time t10. In this case, when at least one of the difference between the maximum and the minimum of the x coordinate values of the integrated input points, and the other difference between the maximum and the minimum of the y coordinate values of the integrated input points is enlarged from the area of the rectangular region A(t0) in the time t0 more than a predetermined value (e.g. 5 mm), the calculation of the integrated input points is resumed. The input point P3 is excluded from the input points to be integrated. Besides, the input point P3 may be the input point for the picture operation, but not the input point for the erase-operation.

As described above, according to the seventh embodiment of the present invention, the region including the input points at which the variation amount in the distance between the input points is the second predetermined value V2 or less, is set as the erase range.

Thereby, the input points to be included in the erase range can be decided according to the variation of the distance between the input points at each cycle. Therefore, even if another input operation (the picture operation or the like) different from the erase-operation is conducted near to the erase range, the erase-operation and another input operation can be differentiated to prevent misjudgment. Further, if the region of executing the erase-operations is moved not only linearly but also curvedly, the input points to be integrated can be properly detected.

Eighth Embodiment

An eighth embodiment of the present invention will be described. For convenience of explanation, like elements to the above-described embodiment are denoted by like reference numerals in the eighth embodiment and their explanation is omitted.

The eighth embodiment of the present invention combines the integration method of the input points according to the sixth embodiment of the present invention (the method to integrate the input points at which the mobile vectors of the detected input points at each time is within the predetermined deflection) with the integration method of the input points according to the seventh embodiment of the present invention (the method to integrate the input points at which the variation width of the distances between the adjacent detected input points at each time is the second predetermined value V2) or less.

Figure 18:
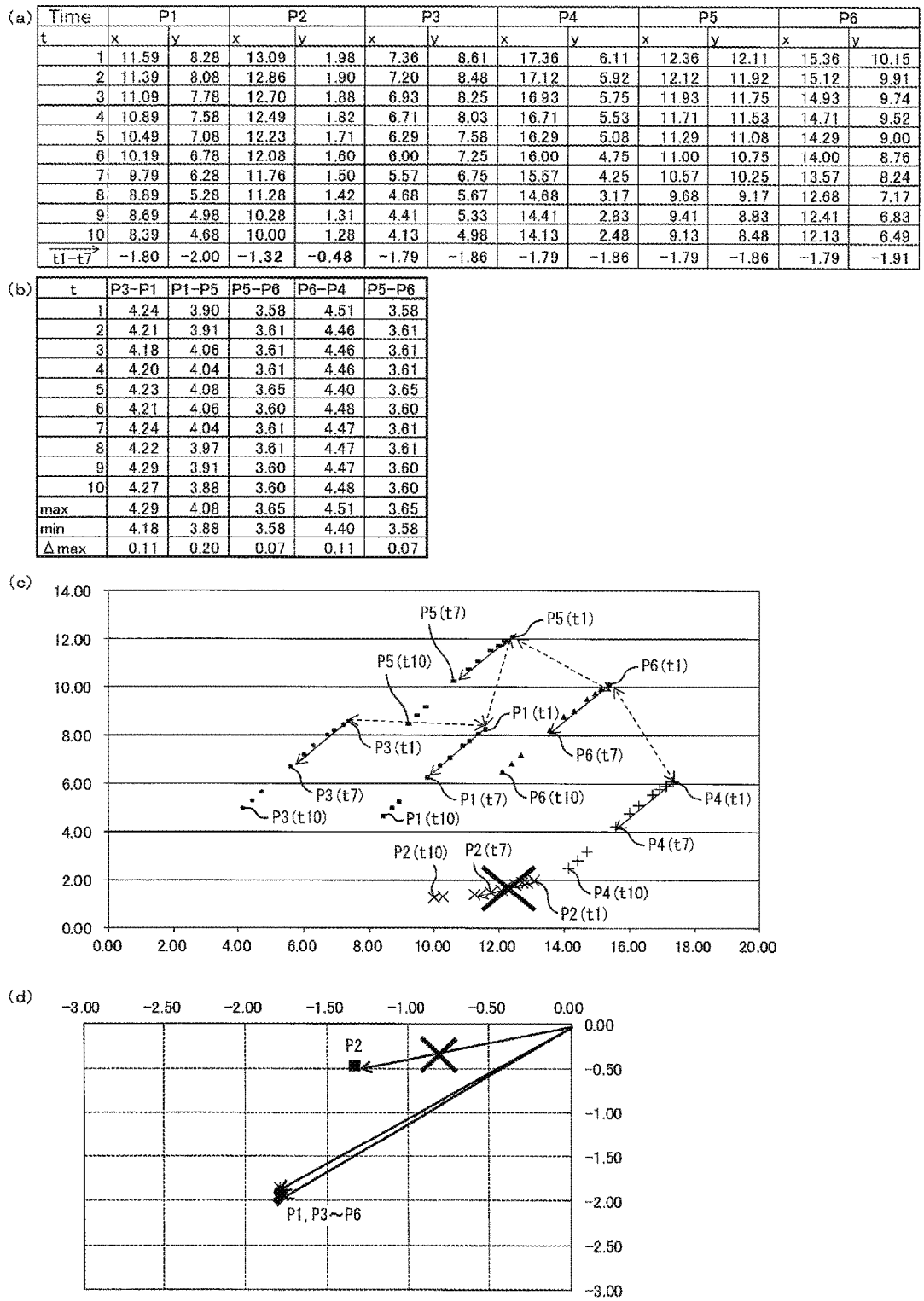
FIG. 18 is a diagram showing a process whether or not the erase-operation is determined on the basis of the input points according to a seventh embodiment of the present invention, and is a diagram showing a process that the erase range is set on the basis of the input points by the user, wherein (a) is a coordinate detection value per a predetermined cycle at each input point, (b) is a distance between adjacent input points per a predetermined cycle, (c) is a detected coordinate value of the each input point, and (d) is a mobile vector at each input point.

FIG. 18 is a diagram showing a process whether or not the erase-operation is determined on the basis of the input points, and is a diagram showing a process that the erase range is set on the basis of the input points by the user, wherein (a) is a coordinate detection value per a predetermined cycle at each input point, (b) is a distance between adjacent input points per a predetermined cycle, (c) is a detected coordinate value of the each input point, and (d) is a mobile vector at each input point. The example of FIG. 18 is based on the measurement data similar to the example of FIG. 15. The input points P1-P6 are detected in the time from t0=0 sec to t10=50 msec.

At first, the input point detecting unit 31 detects the input points at each cycle (e.g. 5 msec in the eighth embodiment of the present invention). Then, the region setting unit 34 calculates the mobile vectors at each time (30 msec as the period from t1 to t7 in the eighth embodiment of the present invention). The mode determining unit 36 excludes the input points at which the deflection of the mobile vectors is out of a predetermined range (e.g. the range of ±3 mm each in the x direction and the y direction) from the input points to be integrated. Thereby, in the example of FIG. 18, as shown in (a), the mobile vector of the input point P2 is out of the predetermined range, so that, as shown in (c) and (d), the input point P2 is excluded from the input points to be integrated, at the time t7.

When the number of the input points, at which the deflection of the mobile vectors is within the predetermined range, is less than the second predetermined number N (e.g. 2), the mode determining unit 36 determines that it is not the erase-operation.

On the other hand, when the number of the input points, at which the deflection of the mobile vectors is within the predetermined range, is the second predetermined number N (e.g. 2) or more, the mode determining unit 36 calculates the variation of the distance between the adjacent input points in the predetermined period each time the period (50 msec as the period from t1 to t10 in the eighth embodiment of the present invention) is passed.

When the number of the input points, at which the variation is the second predetermined value V2 (e.g. 2 mm) or less, is less than the third predetermined number N3 (e.g. 2), the mode determining unit 36 determines that it is not the erase-operation.

On the other hand, when the number of the input points, at which the variation is the second predetermined value V2 or less, is the third predetermined number N3 or more, the mode determining unit 36 determines that it is the erase-operation. In this case, the erase range setting unit 37 sets the region including the input points, at which the variation is the second predetermined value V2 or less as the erase range.

According to the eighth embodiment of the present invention, after the input points to be integrated are narrowed down on the basis of the deflection of the mobile vectors of the input points, it is determined whether or not the narrowed-down input points are those to be integrated on the basis of the variation of the distances between the input points.

Then, the calculation process for integrating the input points on the basis of the variation of the distances between the input points can be simplified.

In the case of FIG. 18, the input point P2 is excluded at the time of t7. Accordingly, when it is determined whether or not the input point is to be integrated on the basis of the variation of the distance between the input points in the time of t10, it is only to calculate the input points P1 and P3-P6 except for the input point P2. The calculation can be simplified.

The integration method of the input points according to the sixth embodiment of the present invention (the method to integrate the input points at which the mobile vectors of the detected input points at each time is within the predetermined deflection) is easy to calculate other than the integration method of the input points according to the seventh embodiment of the present invention (the method to integrate the input points at which the variation width of the distances between the adjacent detected input points at each time is the second predetermined value V2) or less. On the other hand, the integration method of the input points according to the seventh embodiment of the present invention can provide higher correctness in setting the erase range than the integration method of the input points according to the sixth embodiment of the present invention. Therefore, the eighth embodiment of the present invention can provide both advantages of the integration method of the input points according to the sixth embodiment of the present invention and the integration method of the input points according to the seventh embodiment of the present invention. Therefore, the setting of the erase range can be correctly by the simplified calculation.

After the input points are narrowed down by the integration method of the input points according to the sixth embodiment of the present invention (the method to integrate the input points at which the mobile vectors of the detected input points at each time is within the predetermined deflection), the distances between the input points may be calculated, so that the input point of which the calculated distances are more than a predetermined determination value may be excluded from those to be integrated by this judgment. Thereby, for example, even if the user's cloth is contacted with the panel unit 21 in performing the erase-operation, the distance between the input point by the user's sleeve and the input point for the erase-operation may be longer than the distance between the input points for the erase-operations, so that the input point by the user's sleeve can be excluded from the input points to be integrated.

Ninth Embodiment

In each of the embodiments of the present invention, the touch panel control unit 23 of the touch panel 2 may be embodied by a logic circuit (hardware) formed in an integrated circuit (IC chip) or the like, or software using CPU (central Processing Unit).

In the latter case, the touch panel control unit 23 includes CPU for executing instructions of a program which is a software for embodying functions, a ROM (Read Only Memory) or a storage (they are called "recording medium") for storing the program and data in a readable manner by a computer (or CPU), a RAM (Random Access Memory) for developing the program. The computer (or CPU) reads the program from the recording medium and executes the program, so that the object of the present invention is attained. As for the recording medium, "an objective medium not temporary", for example, including a tape, disk, card, semiconductor memory, programmable logic circuit or the like may be used. The program may be transmitted to the computer via a transmittable transfer medium (communication network, broadcast, or the like). In addition, the program of the present invention can be embodied by the electronic transfer in the form of data signals embedded in the carrier waves.

Conclusion

The touch panel 2 according to a first mode of the present invention is provided with a plurality of detection points arranged on the display screen to detect the user's touch operation by detecting that an object is contacted with or close to each detection point, the touch panel including the input point detecting unit 31 for detecting, as the input points, the detection points on which the user's touch operation is performed; and the erase-operation determining unit 32 for determining whether or not the user's operation is an erase-operation for erasing an image displayed on the display screen according to the concentrated degree of the input points.

According to the above configuration, it is possible to vary the concentrated degree of the input points by changing the area of the user's touch operation on the display screen, so that it is automatically determined whether the user's touch operation is the erase-operation or any other operation (e.g. the picture operation or the optional menu operation). As a result, it is needless that a touch operation is next operated after any special operation is preliminarily operated indicating that the forthcoming touch operation is to erase the image, or any input instrument is operated which is peculiar to erasing the image. Accordingly, an erase-operation can be easily performed.

In the touch panel 2 according to a second mode of the present invention, the erase-operation determining unit 32 in the first mode of the present invention is modified so as to include the region setting unit 34 for selecting one of the input points detected by the input point detecting unit 31 as a remarkable input points one by one, and for setting a predetermined region centering the selected remarkable input point as a searching range of the remarkable input point; the input point calculating unit 35 for calculating the number of the input points existing in the searching range for every remarkable input points; and the mode determining unit 36 for determining that the user's operation is the erase-operation in a case where the number of such remarkable input points that the number of the remarkable input points calculated by the input point calculating unit 35 is the first predetermined number N1 or more is a predetermined threshold value or more.

According to the above configuration, the user's touch operation is determined to be the erase-operation by calculating the number of the other input points existing in the predetermined range other than the input point only if the number of the other input points, in which the number of the input points included in the searching range is a first number N1 or more, has a number of a predetermined threshold value or more. Then, it can be properly determined whether or not the user's operation is the erase-operation, according to the concentrated degree of the input points.

In the touch panel 2 according to a third mode of the present invention, the erase-operation determining unit 32 in the first mode of the present invention is modified so as to include the region setting unit 34 for selecting one of the input points detected by the input point detecting unit 31 as a remarkable input points one by one, and for setting a predetermined region centering the selected remarkable input point as a searching range of the remarkable input point; the input point calculating unit 35 for assigning a weighting coefficient, which is smaller as a distance between an input point in the searching range and the remarkable input point is longer, to each input points existing in the searching range, and for calculating a total per every remarkable input points, the total summing the assigned weighting coefficients to each input points; and the mode determining unit 36 for determining that the user's operation is the erase-operation in a case where the number of such remarkable input points that the total calculated by the input point calculating unit 35 is the first predetermined value V1 or more is a predetermined threshold value or more.

According to the above configuration, the weighting coefficients, which is smaller as the distance between the input point and the remarkable input point is longer, are assigned to the input points, and it is determined that the user's operation is the erase-operation if the input points, of which the total summed is the first predetermined value V1 or more, has a number of the predetermined threshold value or more. Then, it can be properly determined whether or not the user's operation is the erase-operation, according to the concentrated degree of the input points.

When the mode determining unit 36 in the second mode of the present invention determines that the user's touch operation is the erase-operation, the touch panel 2 according to a fourth mode of the present invention is modified so as to include the erase range setting unit 37 for setting as an erase range to perform an erase process to the image, when the mode determining unit determines that a user's touch operation is the erase-operation, a region including respective input points included within an integration determining range having a reference position and a certain size where the reference position is a position of an input point having a maximum value calculated by the input point calculating unit among the input points detected by the input point detecting unit 31.

According to the above configuration, the erase range can be set according to the input points included within the integration determining range, so that the region according to the user's touch operation can be set as the erase range.

When the mode determining unit 36 in the third mode of the present invention determines that the user's touch operation is the erase-operation, the touch panel 2 according to a fifth mode of the present invention is modified so as to include the erase range setting unit 37 for setting as an erase range to perform an erase process to the image, when the mode determining unit determines that a user's touch operation is the erase-operation, a region including respective input points included within an integration determining range having a reference position and a certain size where the reference position is a position of an input point having a maximum total value calculated by the input point calculating unit among the input points detected by the input point detecting unit 31.

According to the above configuration, the erase range can be set according to the input points included within the integration determining range, so that the region according to the user's touch operation can be set as the erase range. Further, since the input points to be included within the erase range are selected on the basis of the weighting according to the distance between the input points, even if the variation of the contacting degree of the user's touch operation to display panel causes the change of the input points, the erase range can be properly set.

In the touch panel 2 according to a sixth mode of the present invention, the erase range setting unit 37 in the fourth mode and the fifth mode of the present invention is modified so as to make a size of the integration determining range wider than a size of the searching range.

According to the above configuration, the size of the searching range to determine whether it is the erase-operation or not is made to be smaller than the size of the integration determining range for setting the erase range when it is determined that it is the erase-operation. Thereby, when it is determined whether it is the erase-operation or not, the influence of the noise can be removed to thereby enable the precise determination, highly. The erase range can be properly set.

In the touch panel 2 according to a seventh mode of the present invention, in either one of the fourth mode to the sixth mode of the present invention, the erase range setting unit 37 is modified so as to set, as the erase range, the closed curve region surrounded by a closed curve connecting the input points within the integration determining range or the region of the rectangle, the circle or the ellipse including the closed curve region.

According to the above configuration, the erase range can be set according to the input points included within the integration determining range, so that the region according to the user's touch operation can be set as the erase range.

In the touch panel 2 according to an eighth mode of the present invention, in either one of the fourth mode to the seventh mode of the present invention, the erase-operation determining unit 32 is modified so as to determine whether or not the user's operation is the erase-operation at every predetermined cycle, and the region setting unit 34 is modified so as to make the size of the searching range wider than the size before it is firstly determined that the user's operation is the erase-operation, at the subsequent determination time after it is firstly determined that the user's operation is the erase-operation.

According to the above configuration, when it is determined that the user's operation is the erase-operation, the size of the searching range to be applied to the determining process, subsequently, whether or not it is the erase-operation, is made to be wider than the size before it is determined that the user's operation is the erase-operation. Thereby, even if a part of the touched object (the hollow of the user's hand or the like) is tentatively separated from the display screen in the touch operations, the erase-operations can be performed, stably.

In the touch panel 2 according to a ninth mode of the present invention, in either one of the fourth mode to the eighth mode of the present invention, the erase range setting unit 37 is modified so as to renew the setting of the erase range at every predetermined cycle; detect mobile direction of the integration determining range from the previous setting time of the erase range at the present setting time of the erase range; and incorporate an input points existing at the outside of the present integration determining range and existing at a position along the mobile direction to the present integration determining range, into the present erase range.

According to the above configuration, during the touch operation, even if the input means (e.g. the user's hand or the input tool peculiar for the erase-operation) is tentatively separated from the display screen or the touch position thereof is unstable, it is possible to perform the erase-operations, stably.

In the touch panel 2 according to a tenth mode of the present invention, the erase-operation determining unit 32 in the first mode of the present invention is modified so as to determine that the user's operation is the erase-operation in a case where there exist a second predetermined number or more of such input points that a mobile vector calculated for each of the input points at every predetermined time has deflection within a predetermined range among the input points detected by the input point detecting unit; and the erase-operation determining unit 32 in the first mode of the present invention is modified so as to include the erase range setting unit 37 for setting as an erase range to erase the image, a region including each of the input points having the mobile vector within the predetermined deflection, when the erase-operation determining unit 32 determines that it is the erase-operation.

According to the above configuration, the input points to be included in the erase range can be decided according to the mobility of the input points (the touch point by the user's touch operation). Therefore, even if another input operation (the picture operation or the like) different from the erase-operation is conducted near to the erase range, the erase-operation and another input operation can be differentiated to prevent misjudgment.

In the touch panel 2 according to an eleventh mode of the present invention, the erase-operation determining unit 32 in the first mode of the present invention is modified so as to determine that the user's operation is the erase-operation in case where there exist a third predetermined number or more of such input points that a variation width of a distances between the input points in a predetermined time is the second predetermined value V2 or less among the input points detected by the input point detecting unit; and the erase-operation determining unit 32 in the first mode of the present invention is modified so as to include the erase range setting unit 37 for setting as an erase range to erase the image, a region including each of the input points having the second predetermined value V2 or less variation width of the distance between the input points in the predetermined time, when the erase-operation determining unit 32 determines that it is the erase-operation.

According to the above configuration, the input points to be included in the erase range can be decided according to the mobility of the input points (the touch point by the user's touch operation). Therefore, even if another input operation (the picture operation or the like) different from the erase-operation is conducted near to the erase range, the erase-operation and another input operation can be differentiated to prevent misjudgment.

In the touch panel 2 according to a twelfth mode of the present invention, the erase-operation determining unit 32 in the first mode of the present invention is modified so as to determine that the user's operation is the erase-operation in a case where there exist a second predetermined number N2 or more of such input points that a mobile vector calculated for each of the input points at every predetermined time has deflection within a predetermined range among the input points detected by the input point detecting unit 31 and there exist a third predetermined number N3 or more of such input points that a variation width of a distance between the input points in a predetermined time is a second predetermined value V2 or less; and the erase-operation determining unit 32 in the first mode of the present invention is modified so as to include the erase range setting unit 37 for setting, as the erase range to erase the image, a region including each of the input points having the mobile vector within a predetermined deflection and having the second predetermined value V2 or less variation width of the distance between the input points in the predetermined time, when the erase-operation determining unit 32 determines that it is the erase-operation.

According to the above configuration, the input points to be included in the erase range can be decided according to the mobility of the input points (the touch point by the user's touch operation). Therefore, even if another input operation (the picture operation or the like) different from the erase-operation is conducted near to the erase range, the erase-operation and another input operation can be differentiated to prevent misjudgment.

In either one of the fourth mode to the twelfth mode of the present invention, the touch panel 2 according to a thirteenth mode of the present invention is modified so as to include the input information outputting unit 33 for outputting the information corresponding to the user's touch operation to the information processing device 3, so that when the erase-operation determining unit 32 determines that it is the erase-operation, the input information outputting unit 33 outputs the information indicating the erase range, and when the erase-operation determining unit 32 determines that it is not the erase-operation, the input information outputting unit 33 outputs the position information of the input points detected by the input point detecting unit 31.

According to the above configuration, it can be detected whether or not the operation input is the erase-operation, according to the user's operation input, and the information corresponding to the determination result can be output. Therefore, it is possible for the user to easily input a variety of operation inputs.

In the touch panel 2 according to a fourteenth mode of the present invention, in the thirteenth mode of the present invention, the input information outputting unit 33 is modified so as to output the position information of an input points having a distance from the erase range is a predetermined distance or more among the input points at the outside of the erase range detected by the input point detecting unit 31, when the erase-operation determining unit 32 determines that it is the erase-operation; and not to output the position information of the input points having a distance of the input points from the erase range is less than the predetermined distance.

According to the above configuration, it is possible to prevent the output of the position information due to an excess input because of a false input (e.g. the touch of the wristwatch, bracelet, clothing, button of the user or the like) during the erase-operation.

An operation determining method for determining a user's touch operation on the touch panel 2, according to a fifteenth mode of the present invention, the touch panel 2 being provided with a plurality of detection points arranged on a display screen to detect the user's touch operation by detecting that an object is contacted with or close to each detection point, the operation determining method for determining the erase-operation to the touch panel 2 including: an input point detecting step for detecting, as input points, the detection points on which the user's touch operation is performed; and an erase-operation determining step for determining whether or not the user's operation is an erase-operation for erasing an image displayed on the display screen according to concentrated degree of the input points.

According to the above configuration, it is possible to vary the concentrated degree of the input points by changing the area of the user's touch operation on the display screen, so that it is automatically determined whether or not the user's touch operation is the erase-operation or any other operation (e.g. the picture operation or optional menu operation). Therefore, it is needless that the touch operation is next operated after any special operation is preliminarily operated indicating that the forthcoming touch operation is to erase the image, or any input instrument is operated which is peculiar to erasing the image, as the conventional technique. Accordingly, the input of the erase-operation can be easily performed.

The touch panel 2 of according to each mode of the present invention may be embodied by a computer, and, in such a case, the computer is operated as the erase-operation determining unit (software element) provided with the touch panel 2, so that the touch panel may be in the form of a control program for the touch panel as embodied by the computer, and the touch panel may be stored in a computer readable recording medium, as embraced by the scope of the present invention.

As this invention may be embodied in several forms without departing from the spirit or essential characteristics thereof, the present embodiments are therefore illustrative and not restrictive. It is understood that the present disclosure of the preferred form has been changed in the details of construction and the combination and arrangement of parts may be resorted to without departing from the sprit and the scope of the invention as hereinafter claimed. Further, the technical means disclosed in each of the present embodiments are combined to make new technical features.

INDUSTRIAL APPLICABILITY

It is possible to apply the present invention to the touch panel for erasing a part of the image displayed on the display screen according to the user's touch operation.

EXPLANATION OF REFERENCE NUMERALS

1 display device
2 touch panel
3 information processing device
11 display unit
12 display driving unit
13 display control unit
21 panel unit
22 panel driving unit
23 touch panel control unit
24 transmitter unit
25 receiver unit
26 drive control unit
27 erase range setting unit
31 input point detecting unit
32 erase-operation determining unit
33 input information outputting unit
34 region setting unit
35 input point calculating unit
36 mode determining unit
37 erase range setting unit
100 picture device
205, 206, 208, 210, 212, 213 input point
301 circle (searching range)
401 circle (integration determining range)
402 region (closed curve region)
501 rectangle (erase range)

What is claimed is:
1. A touch panel provided with a plurality of detection points arranged on a display screen to detect a user's touch operation onto the display screen by detecting that an object is contacted with or close to each of the plurality of detection points, the touch panel comprising:

input point detecting circuitry that detects, as input points, more than one of the plurality of detection points on which the user's touch operation is simultaneously performed; and erase-operation determining circuitry that determines whether or not the user's touch operation is an erase-operation that erases an image displayed on the display screen according to a concentrated degree in spatial distribution of the input points.

2. The touch panel according to claim 1, wherein the erase-operation determining circuitry includes:

region setting circuitry that selects one of the input points detected by the input point detecting circuitry as a remarkable input point one by one, and that sets a predetermined region centering the selected remarkable input point as a searching range of the remarkable input point;

input point calculating circuitry that calculates a number of the input points existing in the searching range for every remarkable input point; and mode determining circuitry that determines that the user's operation is the erase-operation in a case where the number of such remarkable input points that the number of the input points calculated by the input point calculating circuitry is a predetermined number or more, is a predetermined threshold value or more.

3. The touch panel according to claim 2, further comprising:

erase range setting circuitry that sets as an erase range to perform an erase process to the image, when the mode determining circuitry determines that a user's touch operation is the erase-operation, a region including respective input points within an integration determining range having a reference position and a certain size where the reference position is a position of an input point having a maximum value calculated by the input point calculating circuitry among the input points detected by the input point detecting circuitry.

4. The touch panel according to claim 3, wherein the erase range setting circuitry makes a size of the integration determining range wider than a size of the searching range.

5. The touch panel according to claim 3, wherein the erase range setting circuitry sets, as the erase range, a closed curve region surrounded by a closed curve connecting the input points within the integration determining range or a region of a rectangle, a circle, or an ellipse connoting the closed curve region.

6. The touch panel according to claim 3, wherein the erase-operation determining circuitry determines whether or not the user's operation is the erase-operation at every predetermined cycle, and the region setting circuitry makes a size of the searching range wider than a size before it is firstly determined that the user's operation is the erase-operation, at the subsequent determination time after it is first determined that the user's operation is the erase-operation.

7. The touch panel according to claim 3, wherein the erase range setting circuitry:

renews setting of the erase range at every predetermined cycle;

detects a mobile direction of the integration determining range from a previous setting time of the erase range at a present setting time of the erase range; and incorporates an input point existing outside of the present integration determining range and existing at a position along the mobile direction to a present integration determining range, into a present erase range.

8. The touch panel according to claim 3, further comprising:

an input information outputting circuitry that outputs information corresponding to the user's touch operation to an information processing device, wherein the input information outputting circuitry outputs the information indicating the erase range, when the erase-operation determining circuitry determines that it is the erase-operation, and the input information outputting circuitry outputs the position information of the input points detected by the input point detecting circuitry, when the erase-operation determining circuitry determines that it is not the erase-operation.

9. The touch panel according to claim 8, wherein the input information outputting circuitry outputs the position information of an input point having a distance from the erase range is a predetermined distance or more among input points at the outside of the erase range detected by the input point detecting circuitry, when the erase-operation determining circuitry determines that it is the erase-operation; and the input information outputting circuitry does not output the position information of the input points having a distance from the erase range is less than the predetermined distance.

10. The touch panel according to claim 1, wherein the erase-operation determining circuitry includes:

region setting circuitry that selects one of the input points detected by the input point detecting circuitry as a remarkable input point one by one, and that sets a predetermined region centering the selected remarkable input point as a searching range of the remarkable input point;

input point calculating circuitry that assigns a weighting coefficient, which is smaller as a distance between an input point in the searching range and the remarkable input point is longer, to each input point existing in the searching range, and that calculates a total per every remarkable input points, the total summing the assigned weighting coefficients to each input points; and mode determining circuitry that determines that the user's operation is the erase-operation in a case where the number of remarkable input points that the total calculated by the input point calculating circuitry is a predetermined value or more, is a predetermined threshold value or more.

11. The touch panel according to claim 10, further comprising:

an erase range setting circuitry that sets as an erase range to perform an erase process to the image, when the mode determining circuitry determines that a user's touch operation is the erase-operation, a region including respective input points included within an integration determining range having a reference position and a certain size where the reference position is a position of an input point having a maximum total value calculated by the input point calculating circuitry among the input points detected by the input point detecting circuitry.

12. The touch panel according to claim 1, wherein the erase-operation determining circuitry includes:

mode determining circuitry that determines that the user's operation is the erase-operation in a case where there exists a predetermined number or more of such input points that a mobile vector calculated for each of the input points at every predetermined time has deflection within a predetermined range among the input points detected by the input point detecting circuitry; and an erase range setting circuitry that sets, as an erase range to erase the image, a region including each of the input points having the mobile vector within the predetermined deflection, when the mode determining circuitry determines that it is the erase-operation.

13. The touch panel according to claim 1, wherein the erase-operation determining circuitry includes:

mode determining circuitry that determines that the user's operation is the erase-operation in a case where there exists a predetermined number or more of such input points that a variation width of a distance between the input points in a predetermined time is a predetermined value or less among the input points detected by the input point detecting circuitry; and an erase range setting circuitry that sets, as an erase range to erase the image, a region including each of the input points having the predetermined value or less variation width of the distance between the input points in the predetermined time, when the mode determining circuitry determines that it is the erase-operation.

14. The touch panel according to claim 1, wherein the erase-operation determining circuitry includes:

mode determining circuitry that determines that the user's operation is the erase-operation in a case where there exists a first predetermined number or more of such input points that a mobile vector calculated for each of the input points at every predetermined time has deflection within a predetermined range among the input points detected by the input point detecting circuitry and there exists a second predetermined number or more of such input points that a variation width of a distance between the input points in a predetermined time is a predetermined value or less; and an erase range setting circuitry that sets, as an erase range to erase the image, a region including each of the input points having the mobile vector within the predetermined deflection and having the second predetermined value or less variation width of the distance between the input points in the predetermined time, when the mode determining circuitry determines that it is the erase-operation.

15. A non-transitory computer readable recording medium that stores a control program of a touch panel that functions on a computer as the touch panel according to claim 1, wherein the control program makes the computer function as the erase-operation determining circuitry.

16. An operation determining method that determines a user's touch operation on a touch panel, the touch panel being provided with a plurality of detection points arranged on a display screen to detect the user's touch operation by detecting that an object is contacted with or close to each of the plurality of detection points, the operation determining method comprising:

an input point detecting step that detects, as input points, more than one of the plurality of detection points on which the user's touch operation is simultaneously performed; and an erase-operation determining step that determines whether or not the user's touch operation is an erase-operation that erases an image displayed on the display screen according to a concentrated degree in spatial distribution of the input points.

* * * * *